United States Patent
Nagasaka et al.

(10) Patent No.: US 8,176,118 B2
(45) Date of Patent: May 8, 2012

(54) SERVER DEVICE, CLIENT DEVICE, INFORMATION PROCESSING SYSTEM, INFORMATION PROCESSING METHOD, AND PROGRAM

(75) Inventors: Hideo Nagasaka, Kanagawa (JP); Shigeru Inoue, Tokyo (JP); Takashi Tominaga, Tokyo (JP); Yasushi Miyajima, Kanagawa (JP); Tadaaki Kimijima, Tokyo (JP); Toshimasa Miyoshi, Kanagawa (JP); Mamoru Tokashiki, Tokyo (JP); Soichiro Atsumi, Shizuoka (JP); Toru Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/263,619

(22) Filed: Nov. 3, 2008

(65) Prior Publication Data
US 2009/0119273 A1    May 7, 2009

(30) Foreign Application Priority Data
Nov. 7, 2007  (JP) .................................. 2007-289691

(51) Int. Cl.
*G06F 15/16* (2006.01)
(52) U.S. Cl. ........ 709/203; 709/200; 709/201; 709/204; 709/217; 709/246; 707/706; 707/736; 707/758; 707/781
(58) Field of Classification Search ........................ None
See application file for complete search history.

(56) References Cited

U.S. PATENT DOCUMENTS

| | | | | |
|---|---|---|---|---|
| 5,442,749 A | * | 8/1995 | Northcutt et al. | 709/219 |
| 5,692,157 A | * | 11/1997 | Williams | 709/246 |
| 5,948,059 A | * | 9/1999 | Woo et al. | 709/206 |
| 6,085,199 A | | 7/2000 | Rose | |
| 6,888,999 B2 | * | 5/2005 | Herberger et al. | 386/278 |
| 6,975,995 B2 | * | 12/2005 | Kim | 704/278 |
| 7,130,892 B2 | * | 10/2006 | Mukai | 709/219 |
| 7,268,287 B2 | * | 9/2007 | Kawashima | 84/600 |

(Continued)

FOREIGN PATENT DOCUMENTS
EP    1473728 A1    11/2004
(Continued)

OTHER PUBLICATIONS

Gonzalez, Nick "JamGlue Launches 'Remixing for the Masses'", TechCrunch, Dec. 15, 2006, http://www.techcrunch.com/?p=4176&preview=false, retrieved on Mar. 18, 2009.

(Continued)

*Primary Examiner* — Hung Le
(74) *Attorney, Agent, or Firm* — Wolf, Greenfield & Sacks, P.C.

(57) ABSTRACT

An information processing method of an information processing system including a client device functioning as a client and a server device functioning as a server which are capable of communication via a network, includes the steps of: at the server device, managing format identification information provided so as to be unique for each content data within the range of each data format, corresponding to the contents of each content; at the client device, causing execution of communication via network, for specifying a content, as to the server device; at the server device, transmitting, to the client device, format identification information correlated with a specified content in response to specification of a content via network from the client device; and at the client device, managing the received and obtained format identification information as corresponding to the specified content.

14 Claims, 28 Drawing Sheets

U.S. PATENT DOCUMENTS

| | | | |
|---|---|---|---|
| 7,558,789 B2 * | 7/2009 | Frieder et al. | 1/1 |
| 7,716,572 B2 | 5/2010 | Beauregard et al. | |
| 8,008,567 B2 * | 8/2011 | Uehara | 84/610 |
| 2002/0013812 A1 | 1/2002 | Krueger et al. | |
| 2002/0194195 A1 | 12/2002 | Fenton et al. | |
| 2003/0126599 A1 | 7/2003 | Novak et al. | |
| 2004/0143598 A1 | 7/2004 | Drucker et al. | |
| 2005/0246377 A1 | 11/2005 | Faso | |
| 2006/0149781 A1 | 7/2006 | Blankinship | |
| 2006/0271494 A1 * | 11/2006 | Ito | 705/59 |
| 2007/0083537 A1 | 4/2007 | Martinez | |
| 2007/0129006 A1 * | 6/2007 | Goldberg et al. | 455/3.06 |
| 2007/0239724 A1 | 10/2007 | Ramer et al. | |
| 2007/0297755 A1 | 12/2007 | Holt et al. | |
| 2007/0299884 A1 | 12/2007 | Komori et al. | |
| 2008/0259745 A1 | 6/2008 | Miyajima et al. | |
| 2008/0208740 A1 * | 8/2008 | Uehara | 705/40 |
| 2008/0235268 A1 | 9/2008 | Miyoshi et al. | |
| 2008/0235356 A1 | 9/2008 | Miyoshi et al. | |
| 2009/0106261 A1 | 4/2009 | Nagasaka et al. | |
| 2009/0297128 A1 | 12/2009 | Nagasaka et al. | |
| 2009/0299823 A1 | 12/2009 | Nagasaka et al. | |
| 2009/0299981 A1 | 12/2009 | Nagasaka et al. | |
| 2009/0300036 A1 | 12/2009 | Nagasaka | |

FOREIGN PATENT DOCUMENTS

| | | |
|---|---|---|
| EP | 1675017 A | 6/2006 |
| EP | 1770616 A | 4/2007 |
| EP | 1930901 A2 | 6/2008 |
| EP | 1973303 A1 | 9/2008 |
| EP | 1973304 A1 | 9/2008 |
| EP | 1980971 A2 | 10/2008 |
| JP | 09-081443 A | 3/1997 |
| JP | 10-135855 | 5/1998 |
| JP | 11-312175 | 11/1999 |
| JP | 2003-085893 A | 3/2003 |
| JP | 2004-310464 A | 11/2004 |
| JP | 2004-536348 | 12/2004 |
| JP | 2006-018753 A | 1/2006 |
| JP | 2006-031233 | 2/2006 |
| JP | 2007-129636 A | 5/2007 |
| WO | 01/15164 | 3/2001 |
| WO | WO 02/075718 A | 9/2002 |
| WO | WO 2005/091133 A1 | 9/2005 |
| WO | WO 2007/112445 A2 | 10/2007 |
| WO | WO 2008/101126 A1 | 8/2008 |

* cited by examiner

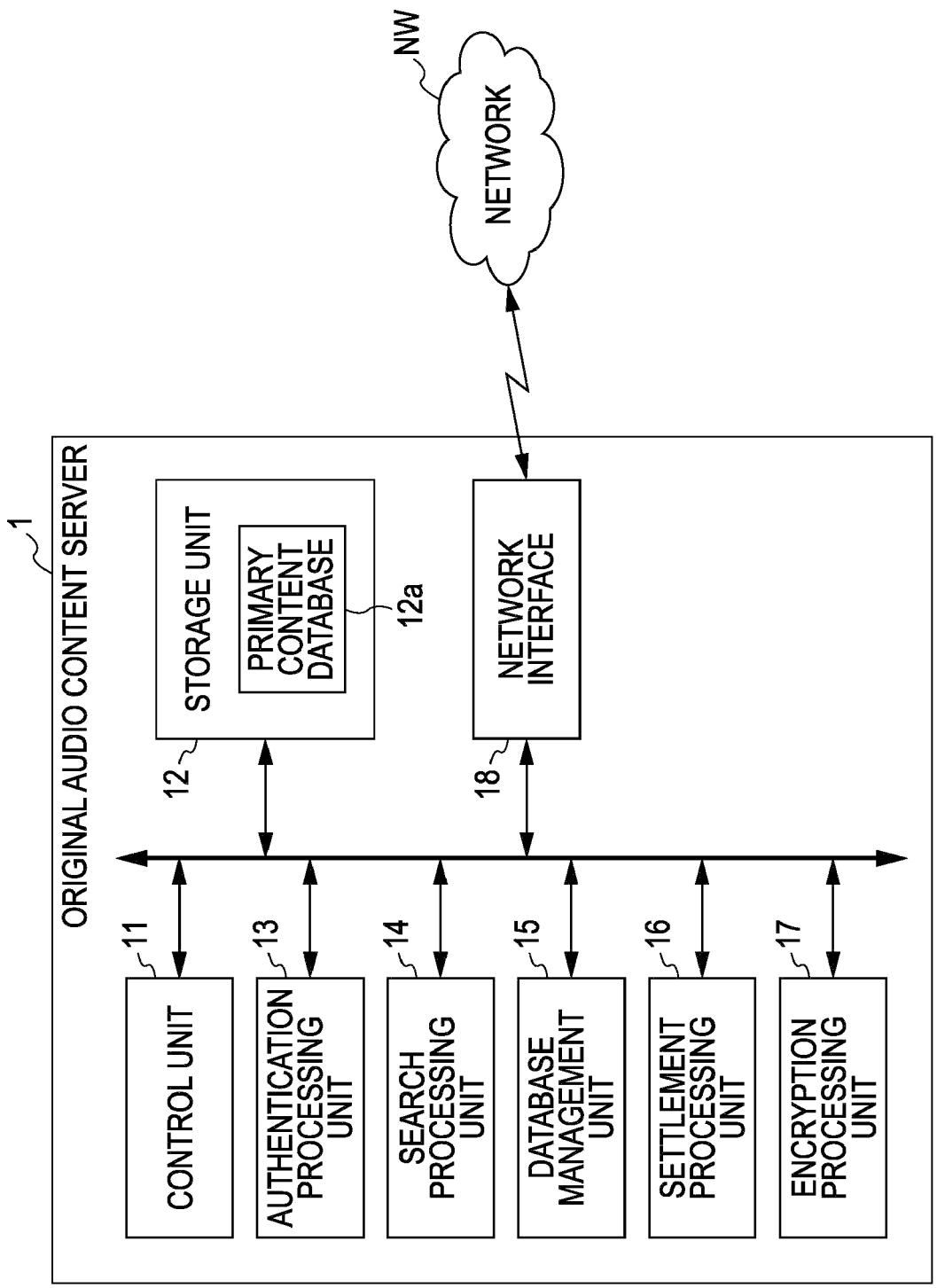

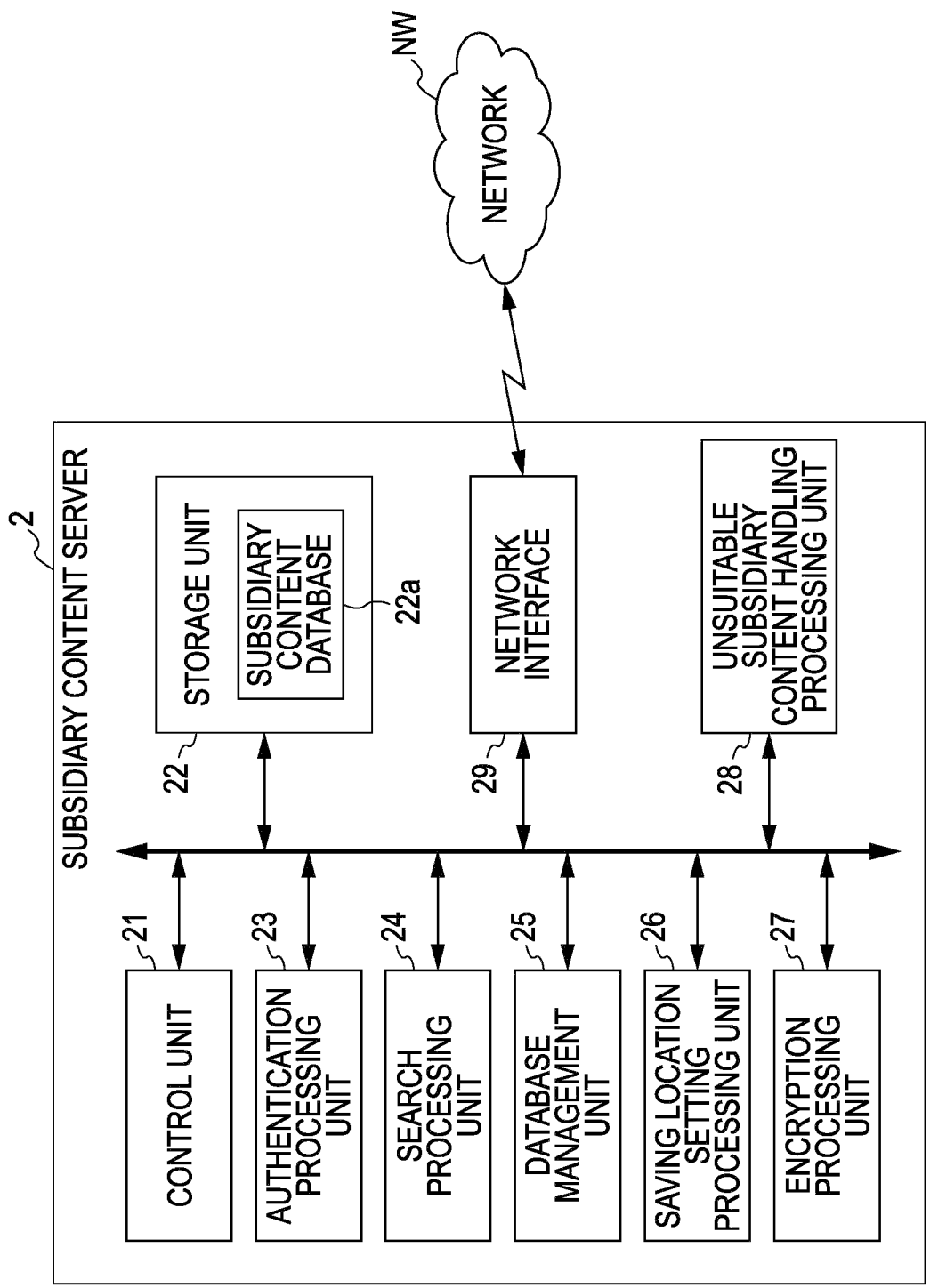

FIG. 13

USAGE PRIMARY CONTENTS INFORMATION

| | | | |
|---|---|---|---|
| UNIT FILE INFORMATION | PRIMARY CONTENT ID | | − − − − |
| | ARTIST NAME | | − − − − |
| | TUNE NAME | | − − − − |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |
| UNIT FILE INFORMATION | PRIMARY CONTENT ID | | − − − − |
| | ARTIST NAME | | − − − − |
| | TUNE NAME | | − − − − |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |
| UNIT FILE INFORMATION | PRIMARY CONTENT ID | | − − − − |
| | ARTIST NAME | | − − − − |
| | TUNE NAME | | − − − − |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |

FIG. 14

USAGE EDITING MATERIAL CONTENTS INFORMATION

| | | | |
|---|---|---|---|
| UNIT FILE INFORMATION | SHARED PRIMARY/SUBSIDIARY CONTENT ID | | - - - - |
| | ARTIST NAME | | - - - - |
| | TUNE NAME | | - - - - |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM 3 | PERMITTED |
| UNIT FILE INFORMATION | SHARED PRIMARY/SUBSIDIARY CONTENT ID | | - - - - |
| | ARTIST NAME | | - - - - |
| | TUNE NAME | | - - - - |
| | USAGE AGREEMENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM 3 | NOT PERMITTED |
| UNIT FILE INFORMATION | SHARED PRIMARY/SUBSIDIARY CONTENT ID | | - - - - |
| | ARTIST NAME | | - - - - |
| | TUNE NAME | | - - - - |
| | USAGE AGREEMENT RANGE INFORMATION | USAGE ITEM 1 | NOT PERMITTED |
| | | USAGE ITEM 2 | PERMITTED |
| | | ⋮ | ⋮ |
| | | USAGE ITEM 3 | PERMITTED |

FIG. 15

PLAY CONTROL INFORMATION

[
file_id = AAAAAA
time = 00:00 − 00:10
position = vv − zz
]
[
file_id = AAAAAA
time = 00:10 − 00:15
position = ss − tt
]
[
file_id = BBBBBB
time = 00:15 − 00:20
position = pp − uu
]
⋮

SHARED PRIMARY CONTENT ID

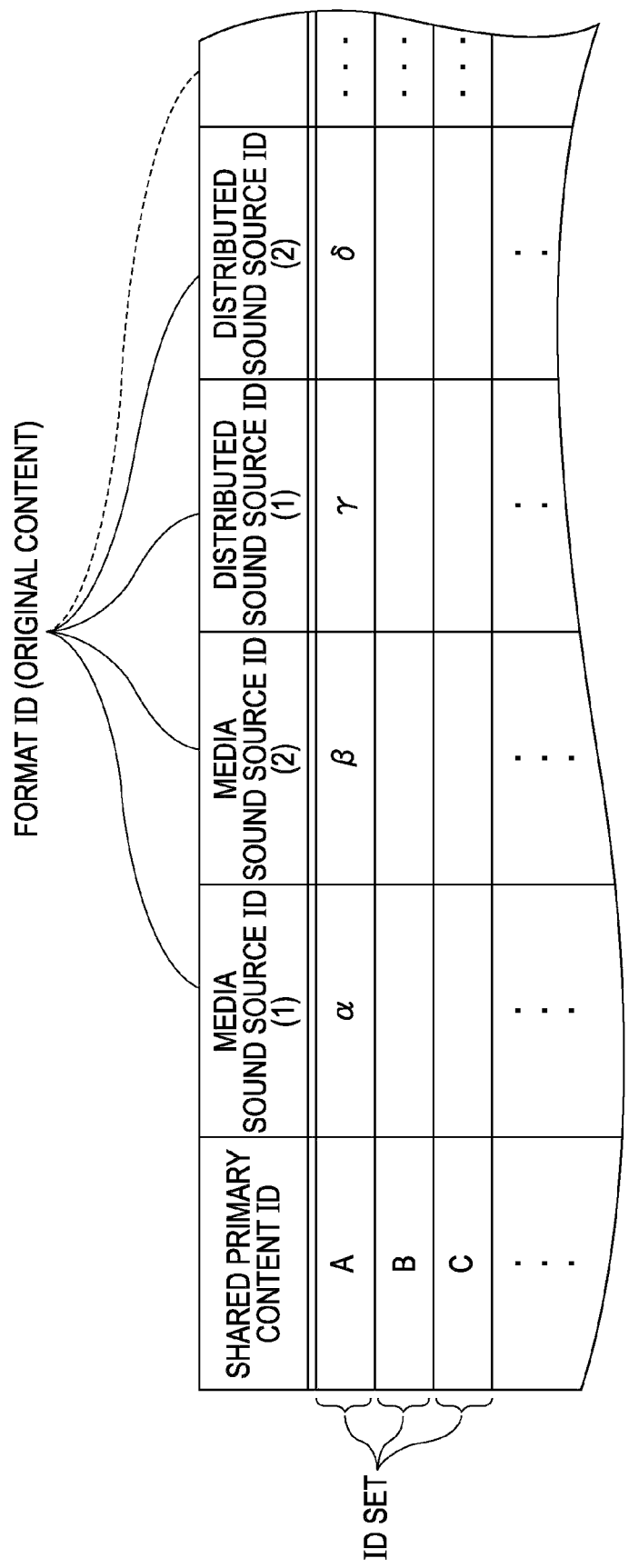

FIG. 26

USER TERMINAL DEVICE (4A)

START → S801 UPLOAD COMPLETED? —NO→ (loop) / —YES→ S802 NOTIFY [ORIGINAL CONTENT ID, SHARED PRIMARY CONTENT ID] FOR EACH PRIMARY CONTENT → END

PRIMARY CONTENT ID MANAGEMENT SERVER

START → S901 OBTAIN RECEPTION → S902 n←1 → S903 SEARCH FOR SHARED PRIMARY CONTENT ID OF n'TH USAGE PRIMARY CONTENT FROM ID DATABASE → S904 SEARCH MATCHED?

- NO → S908 NEWLY REGISTER ID SET WITH SHARED PRIMARY CONTENT ID OF n'TH USAGE PRIMARY CONTENT AND ORIGINAL CONTENT ID → S909 IS n MAXIMUM VALUE? —YES→ END / —NO→ S910 n←n+1 → (back to S903)
- YES → S905 SEARCH FOR ORIGINAL CONTENT OF n'TH USAGE PRIMARY CONTENT FROM ID SET OF SHARED PRIMARY CONTENT FOUND → S906 SEARCH MATCHED?
  - YES → S909
  - NO → S907 NEWLY REGISTER ORIGINAL CONTENT ID OF n'TH USAGE PRIMARY CONTENT IN FOUND ID SET → S909

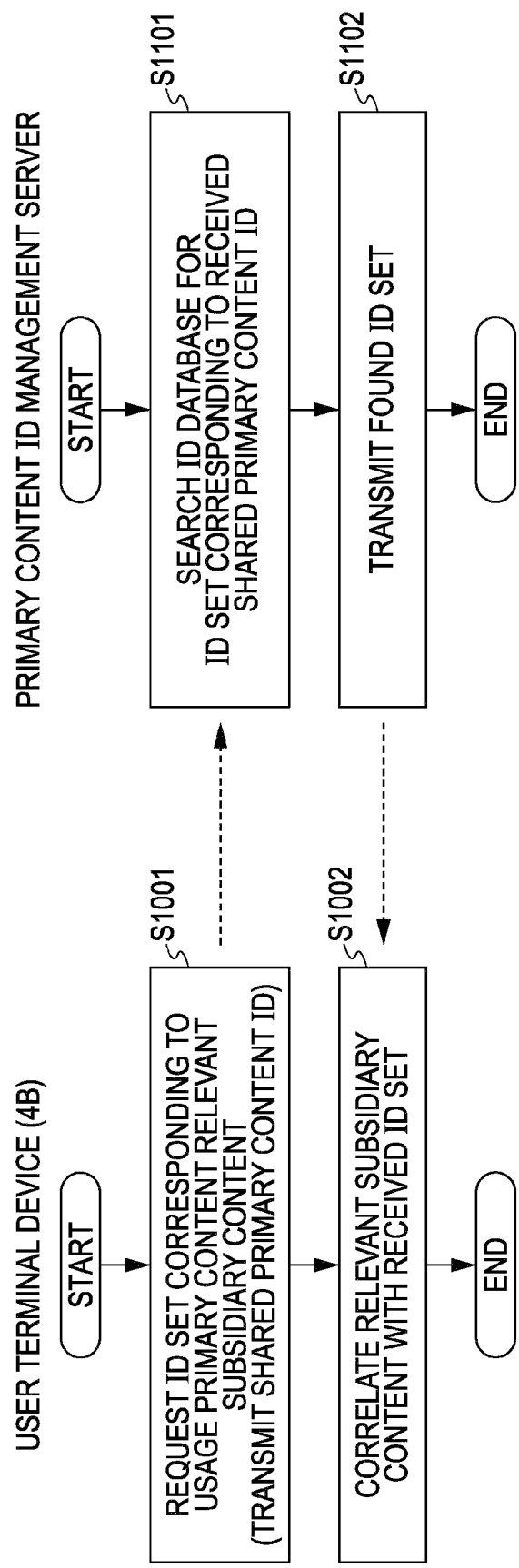

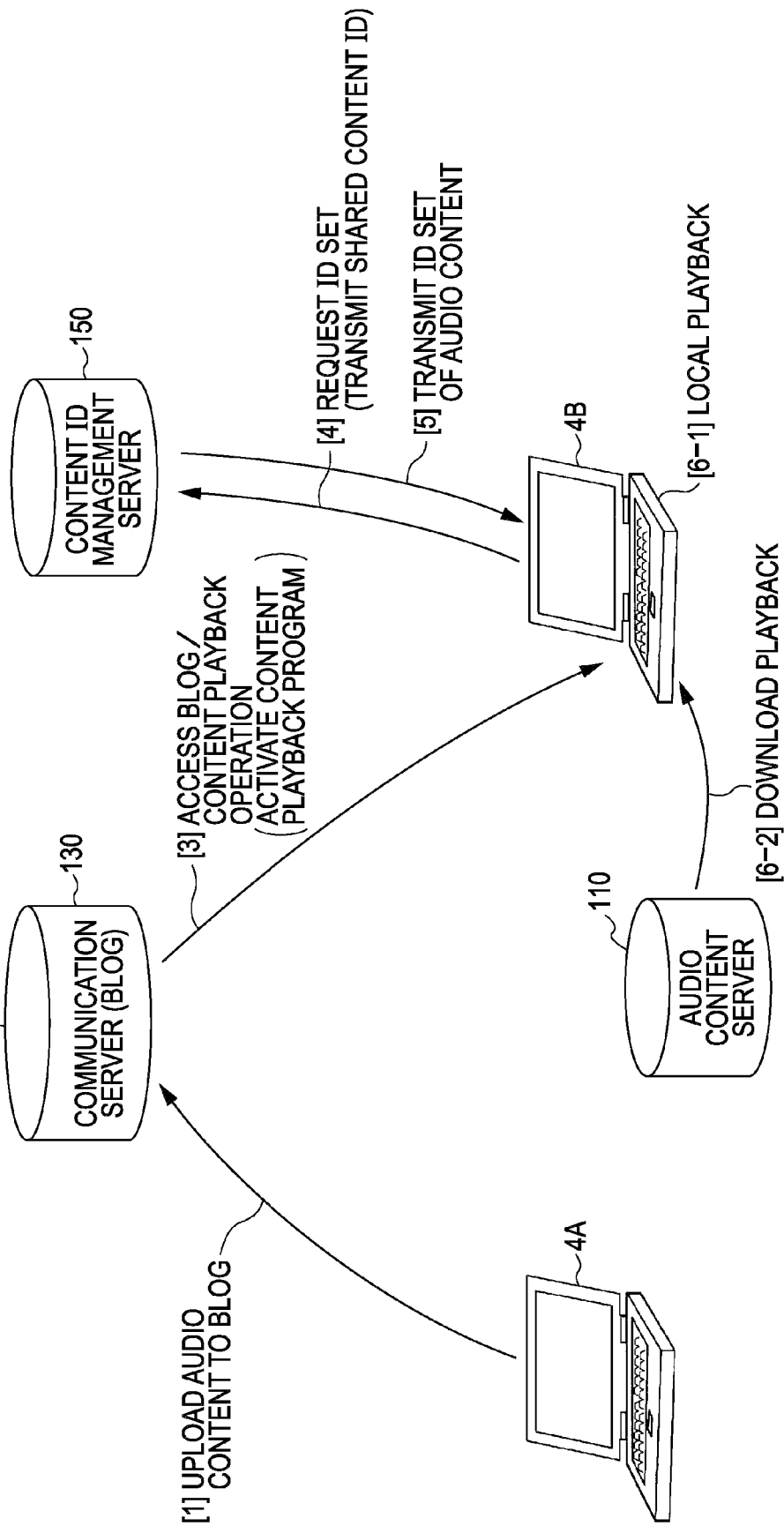

SERVER DEVICE, CLIENT DEVICE, INFORMATION PROCESSING SYSTEM, INFORMATION PROCESSING METHOD, AND PROGRAM

CROSS REFERENCES TO RELATED APPLICATIONS

The present invention contains subject matter related to Japanese Patent Application JP 2007-289691 filed in the Japanese Patent Office on Nov. 7, 2007, the entire contents of which are incorporated herein by reference.

BACKGROUND OF THE INVENTION

1. Field of the Invention

The present invention relates to an information processing system arranged such that music distribution or file sharing or the like, for example, can be performed over a network, a server device and a client device which are components of the information processing system. The present invention also relates to an information processing method corresponding to the information processing system, server device, and client device, and further to a program corresponding to the information processing system, server device, and client device.

2. Description of the Related Art

Widespread digitization of contents has led to multiple formats existing as sound source types and forms, such as a user being able to purchase an audio content for example recorded in packaged media such as a CD (Compact Disc) and also to download exactly the same content by music distribution over a network. Also, packaged media sound sources are not restricted to the PCM format used for recording CDs, and there are also formats such as DSD used for recording SACDs (Super Audio CD). Also, music distribution often involves audio compression encoding, taking into consideration network traffic and reduction in download time, the format of the audio contents such as compression encoding method, and bit rate (compression rate) and so forth often differ from one distribution service to another. That is to say, exactly the same digital content may have varied formats thereof in various forms, including packaged media, music distribution, and so on.

SUMMARY OF THE INVENTION

The above situation leads to certain problems, one of which is trouble in the event that a content playing device which a user has is not arranged to handle the format of a content which the user has obtained. A solution has been proposed in Japanese Unexamined Patent Application Publication No. 2006-31233 wherein user registration is performed in which user information and content information is correlated, user registration authentication is performed in response to user access, and a module for converting a content according to a format requested by the user, or a post-conversion content converted according to the format requested by the user, is provided. With this configuration, the user does not need to purchase a different device even if the format is different.

It has been realized that there it is desirable to solve issues resulting from the same contents having varied sound sources and formats. For example, applications and systems (audio content usage systems) using digital audio contents usually are restricted to being able to handle only a part of sound sources and formats of audio contents. Let us say that a user owns a digital audio content of a format which the audio content usage system does not handle, but the user wants to use this audio digital content with the audio content usage system. One way to deal with this is for the user to obtain a digital audio content which is the same as the one already owned, but of which the format can be handled by the audio content usage system. However, this is troublesome for the user, and furthermore, if the content is not free of charge, this will place a monetary burden on the user.

Thus, it has been realized that there is demand for an environment wherein content can be handled as the same as much as possible even if the format is different, just as long as the content is the same.

An information processing system according to an embodiment of the present invention includes: a client device functioning as a client; a server device functioning as a server, can capable of communication with the client device via a network; a first identification information management unit at the server device configured to manage format identification information provided so as to be unique for each content data within the range of each data format, corresponding to the contents of each content; a content specifying unit at the client device configured to cause execution of communication via network, for specifying a content, as to the server device; an identification information transmitting unit at the server device configured to transmit, to the client device, format identification information correlated with a specified content in response to specification of a content via network from the client device; and a second identification information management unit at the client device configured to manage the received and obtained format identification information as corresponding to the content specified by the content specifying unit.

A server device according to an embodiment of the present invention includes: a communication unit configured to perform communication via a network; an identification information management unit configured to manage format identification information provided so as to be unique for each content data within the range of each data format, corresponding to the contents of each content; and an identification information transmitting unit configured to transmit, to a client device, format identification information correlated with a specified content in response to specification of a content via network from the client device.

A client device according to an embodiment of the present invention includes: a communication unit configured to perform communication via a network; a content specifying unit configured to cause execution of communication via network, for specifying a content, as to a server device; and an identification information management unit configured to receive and obtain format identification information which is identification information corresponding to a specified content transmitted from the server device in response to the communication for specifying the content, and which is provided so as to be unique for each content data within the range of each data format, and manage the received and obtained format identification information as corresponding to the specified content.

Note that in the above, the term "content" or "contents" is an abstract concept equivalent to the video and/or audio therein, and "content data" refers to data for actually playing the video and/or audio which is the above "content" or "contents".

With the above configuration, at the server device, format identification information corresponding to each content is held and managed. Thereupon, the server device transmits, to the client device, format identification information correlated with the specified content in response to specification of a content from the client device. At the client device, the transmitted format identification information is received and managed by correlated with a specified content. Thus, the client device which manages the format identification information can perform predetermined processing regarding contents, using multiple sets of content data sharing the same content of contents (having the same content of contents) but with different data formats.

That is to say, the above configuration is capable of processing contents having a certain content of contents with higher degree of freedom, crossing differences in sound source type, format, platform, and so forth, and accordingly an environment can be obtained wherein contents having different formats can be handled as the same content as long as the contents of the contents are the same.

BRIEF DESCRIPTION OF THE DRAWINGS

FIG. 6 is a diagram illustrating an internal configuration example of an original audio content server;

FIG. 7 is a diagram illustrating an internal configuration example of a subsidiary content server;

FIG. 13 is a diagram illustrating a configuration example of usage primary content information in the subsidiary content playback control file;

FIG. 14 is a diagram illustrating a configuration example of usage editing material content information in the subsidiary content playback control file;

FIG. 15 is a diagram illustrating an example of the content of playback control information, in the subsidiary content playback control file;

FIG. 23 is a diagram illustrating an example of the configuration of a primary content ID database;

FIG. 26 is a flowchart illustrating an example of processing procedures executed by the user terminal device and primary content ID management server with relation to the content ID management in an embodiment;

FIG. 27 is a flowchart illustrating an example of processing procedures for correlating and managing subsidiary contents and ID sets at the user terminal device;

FIG. 29 is a diagram illustrating an example of a system configuration as a modification, for playing uploaded audio content data.

DESCRIPTION OF THE PREFERRED EMBODIMENTS

Figure 1:
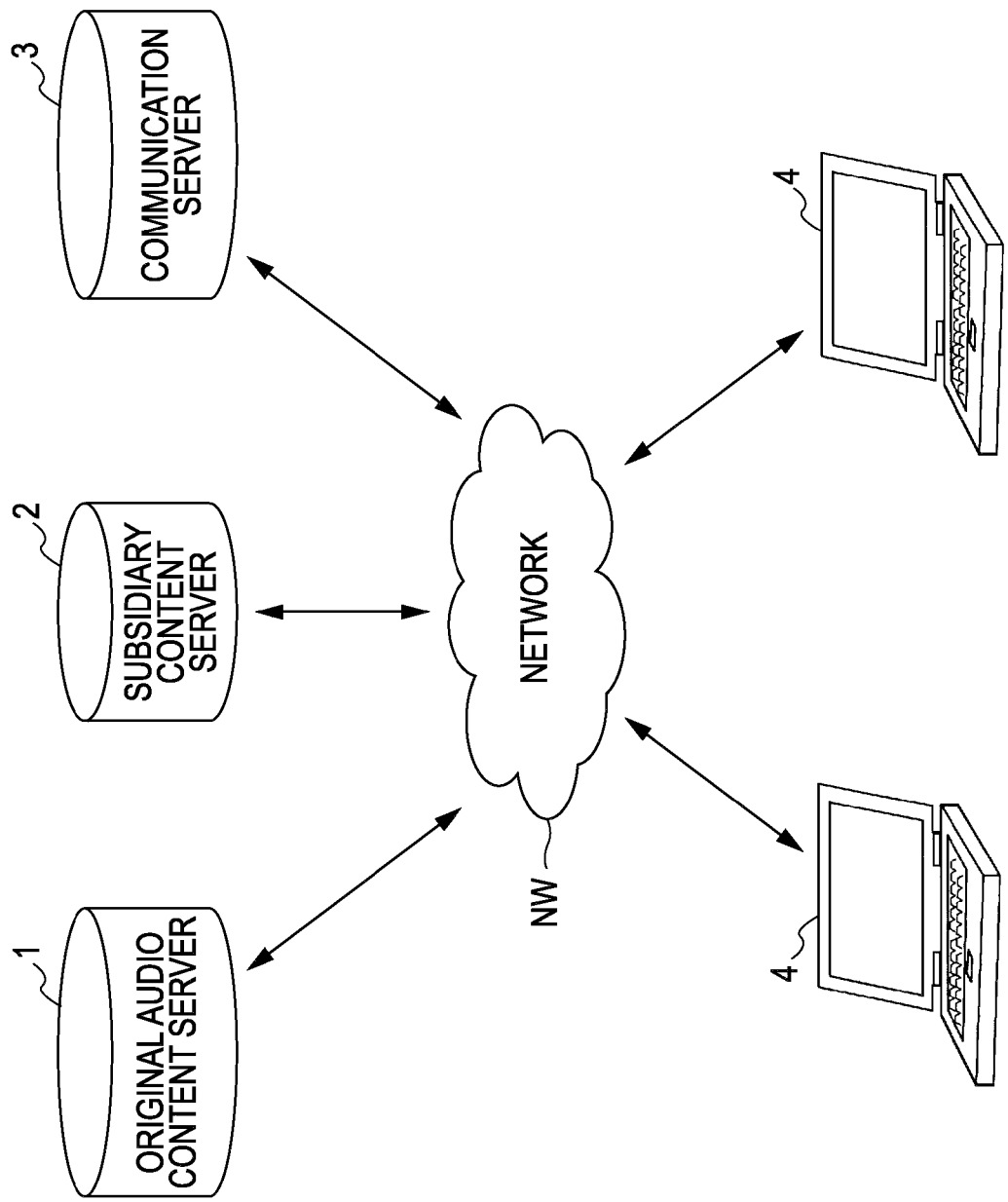
FIG. 1 is a diagram illustrating a configuration example of a music editing/sharing system corresponding to an embodiment of the present invention.

FIG. 1 illustrates a basic configuration example of an information processing system according to an embodiment of the present invention. Note that this basic system configuration illustrated in the drawing is configured of terminal devices and servers which can be viewed as directly relating to usage of service by users. A system according to an actual embodiment takes a configuration further having servers relating to ID management and the like, as compared with the basic system configuration shown in this drawing, but this point will be described later.

As shown in this drawing, the information processing system according to the present embodiment can first be viewed as being formed by connecting a original audio content server 1, a subsidiary content server 2, a communication server 3, and a great number of user terminal devices 4, connected by a network NW. The information processing system according to the present embodiment realizes a music distribution/sharing system by such a basic device configuration. That is to say, so-called music distribution (distribution of original audio contents (primary contents)) and sharing of contents created by users (subsidiary contents) among users, on a network, are realized.

The original audio content server 1 stores and manages in a database a great number of original audio content data in a predetermined format. The "original audio content" as used here is audio data of a predetermined format whereby the content can be played by playback. The original audio content of a vast number of original audio contents which is sued for editing of a subsidiary content is called a primary content.

The original audio content server 1 in this case is configured so as to externally transmit audio data which is specified original audio contents to the requesting user terminal devices 4, in response to download requests from the user terminal devices 4 via the network.

Note that the audio data in the form of original audio contents in the example here is, tunes or the like which artists and the like have played, provided from an affiliated record label. Additionally, original tunes created by general users and so forth, are also included as the contents.

The subsidiary content server 2 is capable of storing and managing a great number of subsidiary content playback control files which is data serving as subsidiary contents, in a database. As described later, a subsidiary content playback control file is uploaded from a user terminal device 4 to the subsidiary content server 2 via the network. The subsidiary content server 2 stores the subsidiary content playback control file uploaded in this way, handling as subsidiary contents. Also, a specified subsidiary content playback control file is transmitted and output to a requesting user terminal device 4, in response to a download request from the user terminal device 4 via the network.

The communication server 3 is a server having functions for providing inter-user communication services, such as for example, SNS (Social Networking Service), services for individuals to put information out which is also widely recognized as CGM (Consumer Generated Media) such as blogs, and so forth.

A user terminal device 4 is a network device which a general user uses, and actually is a personal computer provided with network communication functions such as LAN or the like, for example. These user terminal devices 4 have installed an application program serving as a music editing/sharing application 100, as described later. The user operates this music editing/sharing application 100, and thus is enabled to perform such as downloading original audio contents from the original audio content server 1, creating new subsidiary content due to editing work based on the downloaded original audio contents (primary content) and subsidiary content, uploading the created subsidiary content (i.e., a subsidiary content playback control file) to the subsidiary content server 2, downloading subsidiary content (subsidiary content playback control file) from the subsidiary content server 2, using SNS services, writing/browsing blogs using the communication server 3, and so on.

Next, an example of basic operations of the information processing system according to the present embodiment assuming the configuration shown in FIG. 1 described above, will be described with reference to FIG. 2, following a basic usage form example by a user of a user terminal device 4. Note that in the description in FIG. 2, description will be made following the numbers of procedures and operations indicated by alphanumeric characters in the brackets [ ]. Also, here, user terminal devices 4A and 4B are shown as being used by two users A and B, respectively, as user terminal devices 4. In this drawing, the network NW which exists between the original audio content server 1, subsidiary content server 2, communication server 3, and user terminal devices 4 is omitted from the drawings.

Procedure 1

This Procedure 1 is one method for obtaining data of original audio contents to be used as primary contents, described later.

First, the user A searches the user terminal device 4A (music editing/sharing application 100) for original audio contents which the user wants to download as primary contents, and performs operations for downloading the searched original audio contents. In response to this operation, the user terminal device 4A transmits a download request to the original audio content server 1.

Now, we will say that with the music distribution/sharing system according to the present embodiment, there are cases wherein the downloading of original audio contents is charged for, and cases of being free.

In the case of being charged for, the user A performs proper purchasing procedures at the time of transmitting a download request to the original audio content server 1. As far as purchasing procedures go, for example, this may be payment procedures for charges set individually in increments of tunes or in increments of albums, or may be subscriptions. Also, in the event that original audio contents are provided free of charge, there are no purchasing procedures for the user A.

Upon receiving a download request as described above, the original audio content server 1 first performs authentication regarding the requesting user, confirmation of payment of charges (in the case that the tune download is charged for) and so forth, and determines whether or not this is a legitimate download request. In the event that determination is made that this is a legitimate download, the original audio contents specified at the time of the download request are searched for from the original audio contents stored within itself, and data of the searched original audio contents is sent out to the requesting user terminal device 4. Note that the actual entity of the original audio content which the original audio content server 1 stores while managing in a database here is of a file structure wherein a main portion (main portion information) of audio data of a predetermined format having contents of a tune serving as the primary content (data for reproducing the substantial contents which are in the form of primary contents), includes various types of metadata related thereto (tune title, artist, title of album to which tune belongs, genre, data format, data size, etc.). That is to say, in the description of the present embodiment, we will say that the original audio content data is of a structure wherein the digital audio data whereby the content of the tune can be obtained by performing audio playback output is the main constituent.

The original audio content data sent out from the original audio content server 1 as described above is received at the user terminal device 4A. The user terminal device 4A (music editing/sharing application 100) stores and saves this received original audio content data in a storage medium such as an internal HDD or the like. The music editing/sharing application 100 has functions for managing the original audio content data stored and saved in this way according to a predetermined form based on the metadata for example, and executing playback control in accordance with user operations.

Thus, with this Procedure 1, data of original audio contents stored in the original audio content server 1 can be downloaded to user terminal devices 4 so as to acquire data of primary contents.

While omitted from the drawings here, the data of the original audio contents to be used as primary contents may be acquired by methods other than downloading. For example, original audio content data can be obtained by reading out digital audio data recorded in packaged media and saved in an HDD 48. Also, original audio content data can be obtained by converting an analog sound source into digital audio signals and acquiring via a data interface such as USB (Universal Serial Bus) or IEEE 1394.

Figure 2:
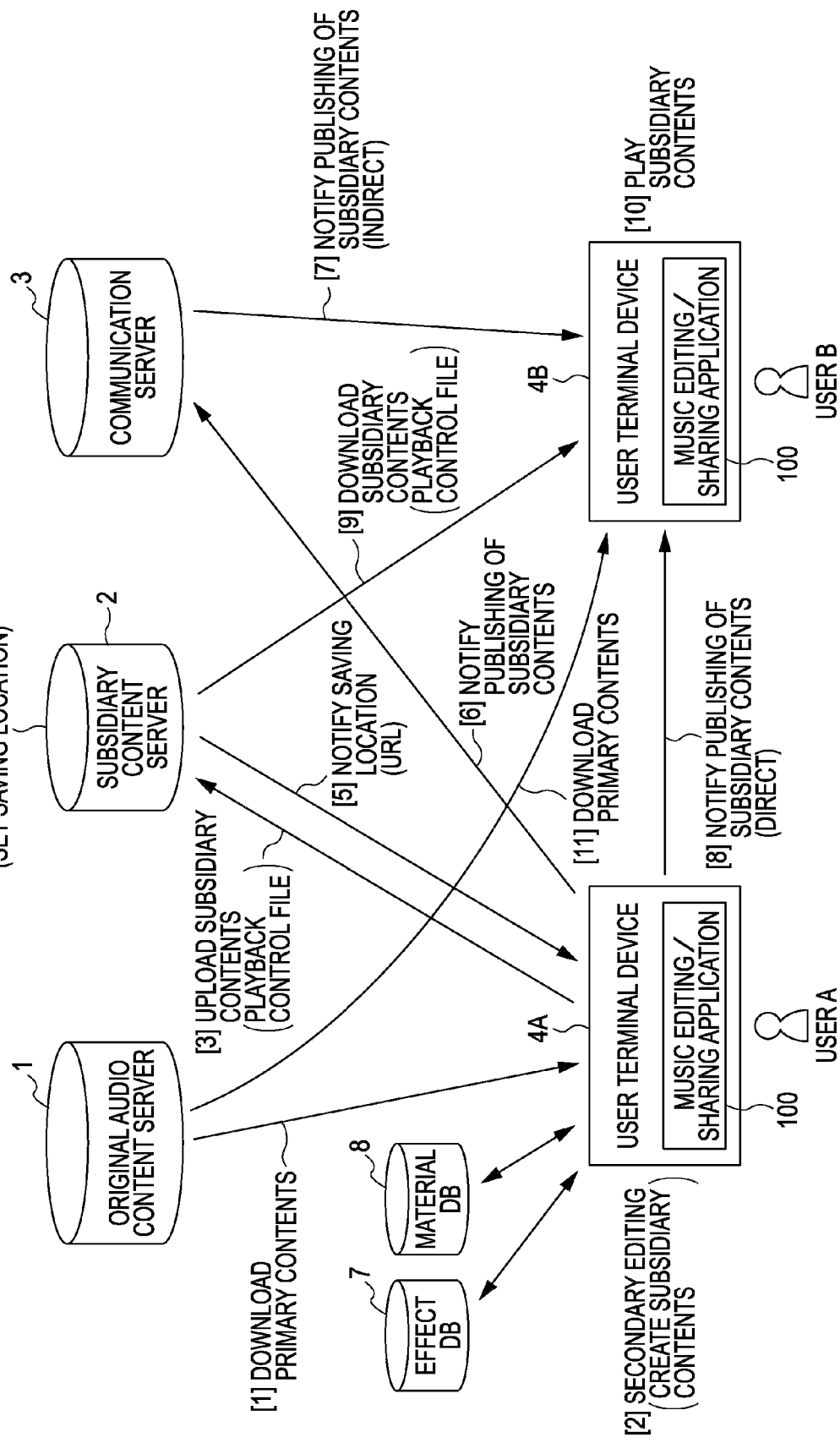
FIG. 2 is a diagram illustrating a basic usage form of a music editing/sharing system according to an embodiment of the present invention, and procedure examples of system operations corresponding thereto.

Also, while only one original audio content server 1 is shown in FIG. 2, in actual practice, downloads can be made from multiple original audio content servers operated by various distribution services, record labels, and so forth.

Note that the primary content data stored and saved at the user terminal device 4A can be played by the music editing/sharing application 100, and listened to with an audio device connected to the user terminal device 4A, for example.

Procedure 2

Now, generally, with music distribution via network, usage following downloading is restricted to use such as playback, with a certain level of copy restrictions of digital audio data being provided. In other words, a user who has obtained audio contents by downloading is normally only permitted usage within a certain range, and is not provided with rights to create tunes as secondary creations by performing editing based on the obtained audio contents that have been acquired, for example.

In comparison to this, with the present embodiment, the original audio content downloaded from the original audio content server 1 is audio content regarding which using as material for secondary creation within a range set beforehand (secondary usage, secondary editing) has been permitted, as a matter of principle, i.e., usable as primary content. Note that secondary usage of the primary content in the present embodiment is set within the range of rights which the writer of the tune as the primary content has authorized.

The music editing/sharing application 100 is capable of creating audio contents as a new tune, by executing editing processing in accordance with user operations to perform secondary usage of the original audio content (primary content) managed in itself (stored and saved) as editing material. Also, at the time of editing such audio contents for example, plug-in data corresponding to predetermined special effects provided at an effect database 7 can be obtained, and editing performed using this. Also, in the same way, audio material provided at a material database 8 can be obtained, and editing performed by adding this. Note that the effect database 7 and material database 8 may be situated on a network, or may exist locally on the user terminal device 4A.

Also, here, audio contents created in this way are distinguished from primary contents to which the original audio contents correspond, by being called subsidiary content. As for the procedure (operation) 2, a certain subsidiary content is created by operating operations as to the user terminal device 4A on which the music editing/sharing application 100 is running.

Note that the actual entity of the data serving as the subsidiary content created by this procedure (operation) 2 is not the digital audio data having the tune content as with the original audio content (primary content), but rather is generated with playback control information as the main constituent thereof. That is to say, this is playback control information describing specifications of effects (special effects), such as instructions of what portion of the digital audio data serving as the secondarily used audio contents (editing material contents) is to be played and output at which timing.

Figure 3:
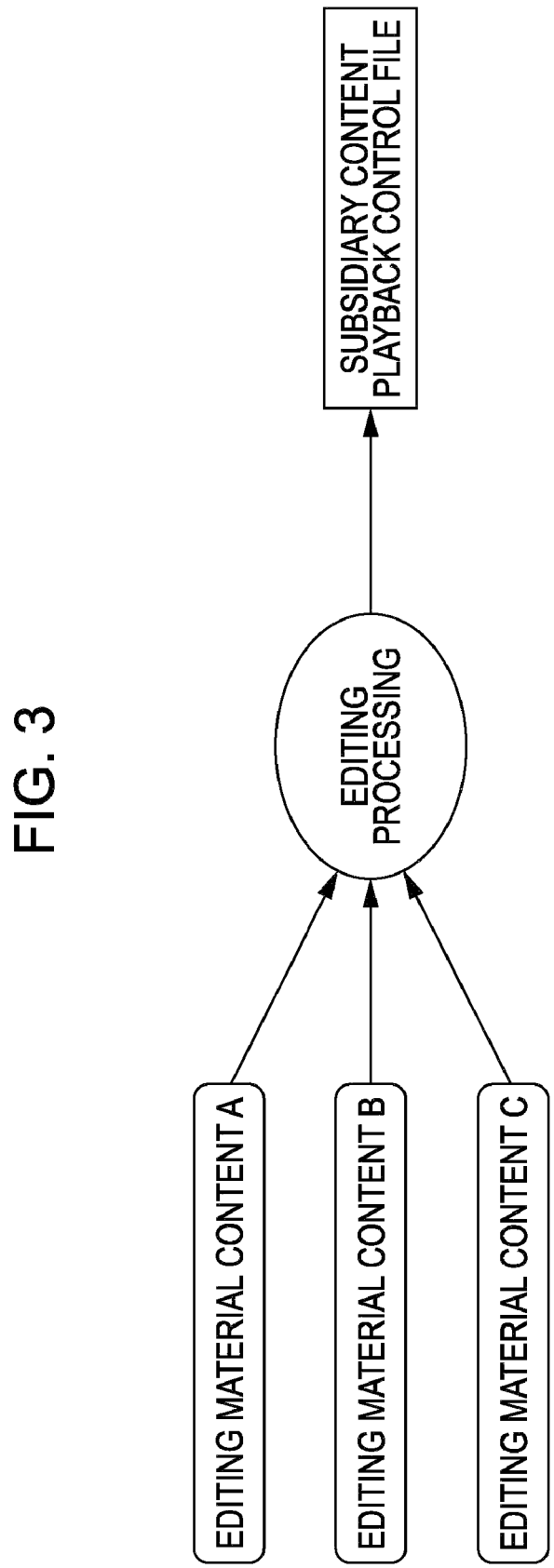
FIG. 3 is a diagram schematically illustrating the flow of subsidiary content creation which a user terminal device according to the embodiment executes.

That is to say, as for the flow of secondary editing with the music editing/sharing application 100, as schematically illustrated in FIG. 3, the editing material contents A, B, and C which are objects of secondary use are used, and subsidiary content playback control information made up of playback control information, rather than being made up of audio data, is created and output, as the results of editing processing having been performed in accordance with user operations.

The subsidiary content data serving as this playback control information (i.e., the subsidiary content playback control information) can be made markedly smaller in data size as compared to audio data, for example. Accordingly, the storage capacity of the storage medium such as the HDD or the like to store the subsidiary content data at the subsidiary content server 2 can be conserved and effectively used. Also, the amount of transmitted data is smaller at the time of transmission/reception of the subsidiary content data on the network, and accordingly does not make traffic heavier, for example.

Performing editing with already-existing tunes as material, as with the secondary editing with the present embodiment, to create a secondary work as a new tune is called sampling, mash-up, and so forth, with professional musicians and the like also often performing this. In light of such, it is naturally conceivable that there is desire and demand of general people to create tunes as secondary works in the same way. However, in reality, it is extremely difficult for general people to create tunes as secondary works upon having properly cleared copyright issues.

Accordingly, as for the music distribution/sharing system according to the present embodiment, an attempt has been made to increase the entertainment nature for the user, by first enabling general users to legally perform secondary editing using distributed tunes.

To this end, the original audio content (primary content) has been positioned as audio contents regarding which a user which has downloaded (purchased) is permitted to use secondarily in the range of rights which the copyright holder has authorized. That is to say, the music distribution service with the original audio content server 1 according to the present embodiment is for distributing audio contents regarding which secondary usage has been proactively permitted.

Procedure 3

The subsidiary content playback control file serving as the subsidiary content created by the user A as described in Procedure 2 above is saved only at the user terminal device 4A, with processing being performed by the playback functions of the music editing/sharing application 100 as described later with FIG. 4, and audio of the tune contents can be played as the subsidiary content.

With this in mind, the present embodiment further enables users who have the services of the music editing/sharing application 100 according to the present embodiment to share the subsidiary contents created by users, by making public on a network.

Let us say that the user A desires to share subsidiary contents created by the above Procedure 2. Accordingly, the user A performs predetermined operations as to the music editing/sharing application 100, so as to upload the subsidiary contents created by the Procedure 2 to the subsidiary content server 2. This is Procedure 3.

As described above, the entity of the data serving as the subsidiary contents is a subsidiary content playback control file. Accordingly, by uploading a subsidiary content as this Procedure 3, the user terminal device 4A (music editing/sharing application 100) transmits and outputs a subsidiary content playback control file along with an upload request.

Procedure 4

Upon receiving the upload request as described above, the subsidiary content server 2 saves the subsidiary content playback control file which is data serving as subsidiary content transmitted along with this request, as a principle, so as to be newly registered in a database. At this time, the subsidiary content server 2 sets the saving location thereof (e.g., represented by an address such as a URL (Uniform Resource Locator)), and then performs saving processing of the subsidiary content playback control file and registration thereof in the database.

Note that the subsidiary content server 2 has publishing functions with regard to the subsidiary content registered in the database. That is to say, the subsidiary content server 2 can publish so as to present a list of subsidiary contents registered in the database for example, in response to access from the user terminal device 4 (music editing/sharing application 100). Also, the subsidiary contents published in this way can be transmitted and output in response to download requests from the user terminal device 4 (music editing/sharing application 100), as described later.

Procedure 5

Upon saving and managing the subsidiary content playback control file as described above, the subsidiary content server 2 transmits, to the upload requesting user terminal device 4A, an address indicating the saving location of the subsidiary content (subsidiary content playback control file) that has been uploaded (saving location address), to notify the saving location thereof.

The music editing/sharing application 100 of the user terminal device 4A receives the above saving location address, and stores and saves, and manages this in a predetermined storage medium. The user A can, at any time, output the saving location address of the subsidiary content which he has uploaded by Procedure 2, by performing a predetermined operation as to the music editing/sharing application 100.

Procedure 6

The user A which has obtained the saving location address as described above can announce to other users in several ways that his own subsidiary contents have been published at the subsidiary content server 2.

Procedure 6 corresponds to one of the publishing announcement methods, and is carried out by accessing the communication server 3 as shown in the drawing, and writing to his own page in an SNS, or his own blog or the like, for example, that the subsidiary contents created by himself have been published. At this time, the URL serving as the saving location address obtained in Procedure 5 is also copied in so as to be written in.

Procedure 7

Upon a user B for example operating the music editing/sharing application 100 installed in the user terminal device 4B after the user A has written in as described above with Procedure 6 and accessing and browsing the page of the user A in the SNS or the blog of the user A, he knows that subsidiary content of the user A has been newly published. That is to say, in this case, the user B has indirectly received the announcement regarding the new publishing of the subsidiary content created by the user A, via the SNS or blog. Procedure 7 indicates such indirect announcement of subsidiary content publishing being performed.

Procedure 8

Procedure 8 will be given as another way for publishing announcement. As for this Procedure 8, the user B side is notified that the subsidiary content created by the user A has been disclosed by creating and transmitting mail using a mail function provided to the SNS, for example. This is a more direct form of announcement, as compared to the announcement according to the flow of Procedure 6 and Procedure 7.

Also, in the event of announcing by e-mail and so forth in this way, the saving location address of the subsidiary content is copied into the body for example, so as to be listed.

Procedure 9

In this way, the user B can indirectly or directly receive announcement and know that the subsidiary content created by the user A has been newly published. In the event that the user B desires to listen to the subsidiary content of the user A that has been newly published, first, the subsidiary content is downloaded by the music editing/sharing application 100. This is Procedure 9.

At the time of downloading the subsidiary content, a clicking operation or the like is performed as to the saving location address shown as a link in the body of the SNS diary page or blog, for example. Note that at the time of writing to an SNS diary page or blog, in the event the address information such as a URL is written in, this text string portion is presented as a link.

In response to performing a clicking operation as to the saving location address as described above, the music editing/sharing application 100 accesses this saving location address. That is to say, of the addresses on the subsidiary content server 2, an address indicating the location where the file of the subsidiary content which the user A has created and published (subsidiary content playback control file) has been saved, is accessed. The subsidiary content playback control file saved at that saving location is then sent out to the user terminal device 4B. The subsidiary content playback control file set out in this way as received at the user terminal device 4B, and saving and management is performed under control of the music editing/sharing application 100. Accordingly, subsidiary content is downloaded.

Procedure 10

Upon the subsidiary content of the user A being saved and managed as described above, playing of the subsidiary content by the music editing/sharing application 100 of the user terminal device 4B becomes available. Procedure 10 is a procedure for playing output of the tune serving as the subsidiary content as sound, in accordance with playback instruction operations as to the music editing/sharing application 100 by the user B.

Figure 4:
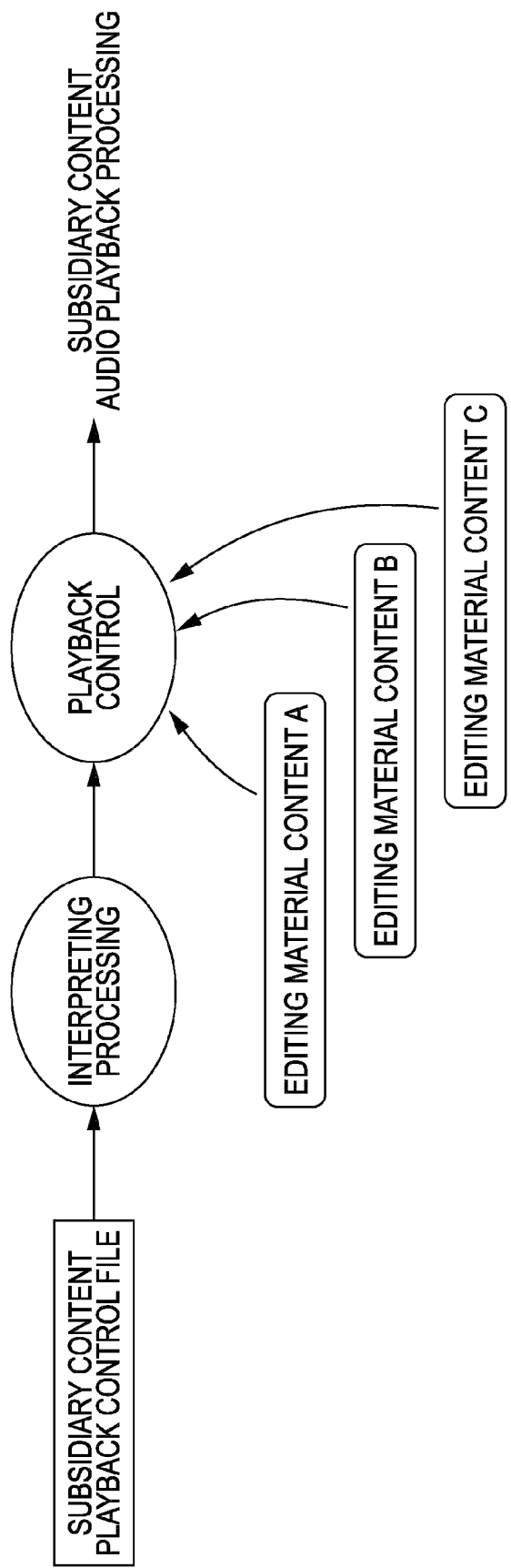
FIG. 4 is a diagram schematically illustrating the flow of subsidiary content creation which a user terminal device according to the embodiment executes.

Now, FIG. 4 shows a playback concept of subsidiary contents with the music editing/sharing application 100.

At the time of playing the subsidiary content, first, the music editing/sharing application 100 interprets the subsidiary content playback control file which is the actual data. As a result of this interpretation, recognition can be made regarding at least which audio contents have been used as the editing material contents, and which portion of the editing material contents have been used in what manner at what playing time, and so forth, for example. Note that in this diagram, the audio contents of the editing material contents A, B, and C, in accordance with FIG. 3 described earlier, have been used as editing material. Following the recognition results thereof, the music editing/sharing application 100 at least uses the actual audio data serving as the editing material contents A, B, and C, to execute playback control. Consequently, the tune contents serving as the subsidiary content is played as sound (audio playback output of the subsidiary content).

According to the description of FIG. 4 above, playing of the subsidiary content uses actual audio data serving as the audio contents used in a subsidiary manner for the subsidiary content, i.e., editing material content. That is to say, in order to play subsidiary content, the actual audio data of the editing material contents has to exist at the same local location as the music editing/sharing application 100, however temporarily. Accordingly, in the event that the editing material contents are not locally saved at the time of attempting to play the subsidiary content, these should be obtained locally.

Procedure 11

Accordingly, in such a case as described above, procedures are performed for downloading and acquiring any editing material contents which are not locally available. Procedure 11 in FIG. 2 is a procedure to be performed to this end in the process of playing contents with Procedure 10.

As can be understood from the description so far, the editing material contents is actual audio data, so as a principle, the editing material contents are primary contents, i.e., original audio contents. Accordingly, in Procedure 11, the original audio content server 1 is accessed and original audio contents to serve as primary contents used for playing the subsidiary content in this Procedure 10 but not existing locally are downloaded. Due to this downloading, the editing material contents used for playing the subsidiary content all exist locally, and playback output can be properly executed as described with FIG. 4.

As described above with Procedure 1 for example, the primary contents (original audio contents) may be made to exist locally by methods other than downloading, such as acquiring packaged media sound source, and that obtained by converting an analog sound source into digital audio signals, acquired via a data interface.

Also, several states of audio data of the primary contents (original audio contents) existing locally due to the downloading in Procedure 11 can be conceived.

First, a form can be conceived wherein this is made to exist locally, in a state of being stored in saved as to an auxiliary storage device such as an HDD, in the same way as with the case of a normal download according to Procedure 1. As for another, a form can be conceived wherein this is temporarily held in a main storage device such as RAM, and is erased in response to the music editing/sharing application 100 no longer being in a state wherein the playback operation of the subsidiary content can be performed, for example. While original audio contents which are primary contents have been described as being basically charged for, for example, operations can be conceived wherein in the case of temporary storage, these are free of charge, or fees are set cheaper than normal downloads, or the like.

Also, according to the description of FIG. 2 above, with creating of subsidiary contents according to the present embodiment, primary contents are used as the editing material contents, but not only primary contents but also subsidiary contents can be included as the editing material contents. This point will be supplemented with reference to FIGS. 5A through 5C, which each illustrate cases of creating one subsidiary content by editing with secondary usage of two editing material contents.

Figure 5A:
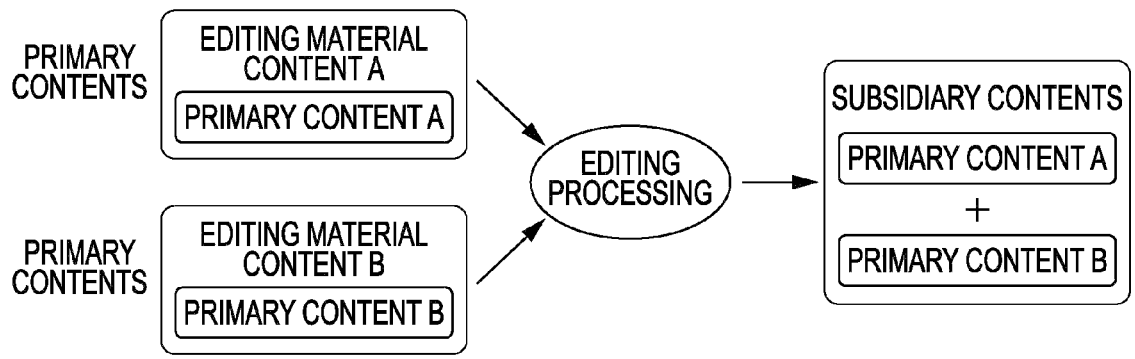
FIGS. 5A through 5C are diagrams illustrating a usage form example of editing material contents at the time of creating a subsidiary content.

First, FIG. 5A illustrates a case wherein the editing material contents A and B are each primary contents, in the same way as with the example of creating subsidiary content described with FIG. 2. That is to say, this shows a case wherein subsidiary content is created by executing editing processing with a primary content A taken as editing material content A, and a primary content B which is a different primary content taken as editing material content B. The subsidiary content in this case includes at least a part of the primary content A and primary content B as for the contents thereof, as shown in the drawing. That is to say, the primary contents A and B are used as source editing material.

Figure 5B:
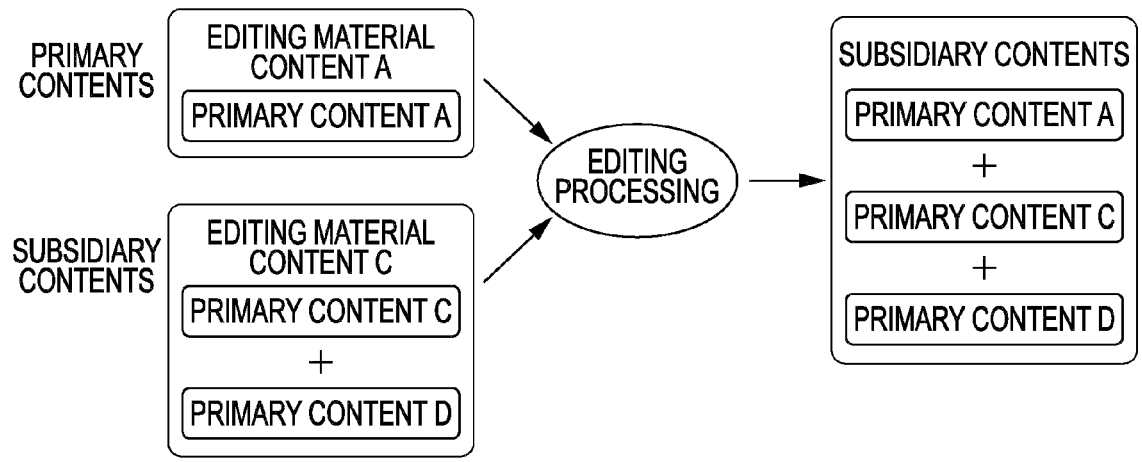

FIG. 5B illustrates creating a subsidiary content by editing with secondary usage of the editing material content A which is the same primary content as in FIG. 5A, and editing material content C which is subsidiary content created using primary contents C and D secondarily. The subsidiary content in this case includes at least a part of the primary content A included in the editing material content A, and at least a part of each of the primary contents included in the editing material content C, as for the tune contents thereof. That is to say, the primary contents A, C and D are used as the original editing material, and accordingly, in the event of playing the subsidiary content shown in FIG. 5B here, the primary contents A, D, and D should be locally situated.

Figure 5C:
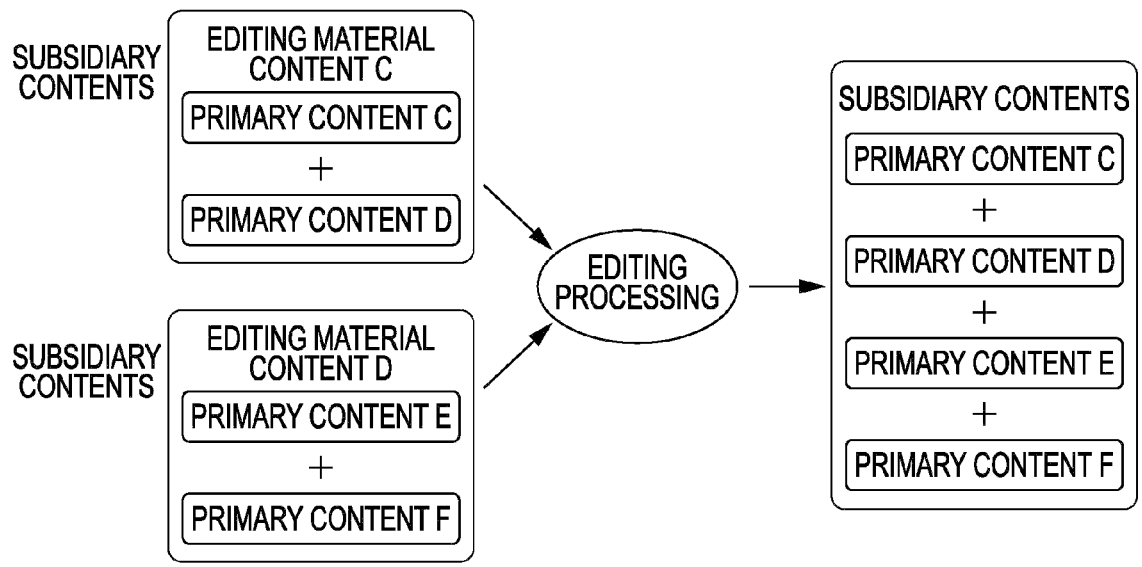

FIG. 5C illustrates creating a subsidiary content by secondary usage of the two editing material contents C and D which are subsidiary contents. The subsidiary content newly created in this case includes at least a part of each of the primary contents C and D included in the editing material content C, and a part of each of the primary contents E and F included in the editing material content D, as for the tune contents thereof. That is to say, the primary contents C, D, E, and F should be locally situated in the event of playing the subsidiary content shown in FIG. 5C.

Also, in the event of using subsidiary contents as editing material contents for creating subsidiary content as in the above FIGS. 5B and 5C, first, the user performs download for example, and stores and saves at the user terminal device 4, in order to situate the subsidiary content serving as the editing material contents locally, in the same way as with handling primary content as editing material content.

Note that as with FIGS. 5B and 5C, in a case of using subsidiary content having multiple primary contents as the editing material thereof, as editing material contents, editing using only a part of the primary contents out of the multiple primary contents making up the editing material contents used as editing material may be added to one form of editing. Specifically, in the case of FIG. 5B for example, editing may be performed wherein, for the editing material content C, only the primary content C is used of the primary contents C and D, and the other primary content D is not included in the post-editing contents. In this case, in order to play the subsidiary content newly created for example, an arrangement is sufficient wherein only the primary contents A and C of the primary contents A, C, and D exist locally.

Also, in event of the subsidiary content server 2 performing transmission of subsidiary content data in response to the download request for subsidiary content, in according with Procedure 9 in FIG. 2, the subsidiary content is encrypted. This encryption can be decrypted by an authorized music editing/sharing application 100, but the music editing/sharing application 100 is arranged to operate such that only subsidiary content data decrypted by this encryption processing is played, and subsidiary content data not encrypted to begin with for example, or subsidiary content data encrypted by another format or algorithm, is not played. That is to say, the music editing/sharing application 100 only plays that downloaded and obtained from the subsidiary content server 2 with regard to externally-obtained subsidiary content data.

Accordingly, for example, even in the event that users directly exchange subsidiary content files between user terminal devices by direct communication such as P2P (Peer-to-Peer) network communication or e-mail file attachment or FTP (File Transport Protocol) or the like, or by direct exchange using removable media, files obtained by users in this way will not be properly played since there is no encryption by the subsidiary content server 2. That is to say, with the present embodiment, subsidiary content of others will not be properly played unless downloaded from the subsidiary content server 2. Accordingly, with the music editing/sharing system according to the present embodiment, protection of the rights of copyright holders of the primary contents and subsidiary contents is implemented by avoiding circulation and reproduction of illegal subsidiary contents violating copyrights over the network.

As can be understood from the description in FIGS. 2 through 5C, with the music distribution/sharing system according to the present embodiment, first, primary contents are downloadable. That is to say, users can download (purchase) and listen to and enjoy tunes which they like by normal music distribution. Based on this, usage rights are set whereby secondary usage to take the primary contents as editing materials is enabled, so users can perform editing with the primary contents as materials and create their own works. Further, subsidiary contents which are works created in this cay can be publicly published using communication techniques such as SNSs and blogs and so forth. That is to say, general users can edit tunes with copyrights as material and create new audio contents (subsidiary contents) and further publicly publish the subsidiary contents, in a proper manner, which has heretofore been considered legally difficult due to problems such as copyrights and so forth.

Also, with the present embodiment, the actual entity of the subsidiary contents are formed having playback control information, formed including at least description instructing playing of primary contents which are the original editing material used by the subsidiary contents.

The music editing/sharing application 100 has playback functions of the subsidiary content, but also has editing functions for creating the subsidiary content. Accordingly, as a form of playback of the subsidiary contents, the music editing/sharing application 100 can not only execute processing for simple audio playback, but also reflect the editing history of the subsidiary content being played in the user interface of the editing function described above, for example. That is to say, as a benefit of the actual content of the subsidiary content being taken as the playback control information, the user can use the editing functions of the music editing/sharing application 100 to find out in detail how the downloaded subsidiary content has been edited.

Next, an example of a technical configuration for realizing the usage form and operations as the music distribution/sharing system according to the present embodiment described so far, will be described.

First, FIG. 6 illustrates an internal configuration example of the original audio content server 1. As shown in this drawing, the original audio content server 1 includes a control unit 11, a storage unit 12, an authentication processing unit 13, a search processing unit 14, a database management unit 15, a settlement processing unit 16, an encryption processing unit 17, and a network interface 18.

The control unit 11 is a member which centrally executes various types of control processing at the original audio content server 1.

The storage unit 12 is configured having an HDD or the like for example, and stores a original audio content database 12a. The original audio content database 12a is information increments wherein audio data files serving as original audio contents to be distributed have been databased. Note that audio data files serving as primary contents have a predetermined format wherein, in addition to the actual data as audio data, various types of metadata have been added.

The authentication processing unit 13 executes predetermined authentication processing regarding whether a valid user or not, in the event of a download request having been made for example, using the user ID and password and the like included in that request. Only in the event that the authentication processing results are OK is a primary content transmitted in response to the request.

The search processing unit 14 is a member which cooperates with the database management unit 15 to access the original audio content database 12a and execute processing for searching for intended primary contents.

The database management unit 15 performs management with regard to the original audio content database 12a. For example, in the event that new original audio contents are supplied, the new original audio contents are registered to the original audio content database 12a which is updated in response thereto. Also, in the event of deleting original audio contents, deletion of the original audio contents and updating of the database correspondingly is performed in the same way.

The settlement processing unit 16 executes processing such as settlement as to payment of charges at the user side, relating to pay original audio contents.

The encryption processing unit 17 is a member which executes processing for subjecting original audio contents to be transmitted from the original audio content server 1 to a user terminal device 4 to predetermined encryption.

The network interface 18 is a member for performing communication via the network NW, and reception of download requests and corresponding transmission of original audio contents for example, are realized by the network interface 18 executing communication processing in accordance with the control of the control unit.

FIG. 7 illustrates an internal configuration example of the subsidiary content server 2. As shown in the drawing, the subsidiary content server 2 has a control unit 21, a storage unit 22, an authentication processing unit 23, a search processing unit 24, a database managing unit 25, a saving location setting processing unit 26, an encryption processing unit 27, an unsuitable subsidiary content handling processing unit 28, and a network interface 29.

The control unit 21 is a member which centrally executes various types of control processing in the subsidiary content server 2.

The storage unit 22 is configured having an HDD or the like for example, and stores a subsidiary content database 22a. The subsidiary content database 22a is information increments wherein subsidiary content playback control files, which are actual data serving as subsidiary content to be published here, have been databased.

The authentication processing unit 23 executes predetermined authentication processing regarding whether a valid user or not, in the event of a download request for subsidiary content having been made for example, using the user ID and password and the like included in that request.

The search processing unit 24 is a member which cooperates with the database management unit 25 to access the subsidiary content database 22a and execute processing for searching for intended subsidiary contents.

The database management unit 25 performs management with regard to the subsidiary content database 22a. For example, in the event that new subsidiary contents (subsidiary content playback control files) are uploaded, the uploaded subsidiary contents are registered to the subsidiary content database 22a which is updated in response thereto. Also, in the event of deleting subsidiary contents (subsidiary content playback control files), deletion processing to this end and updating of the database corresponding to the deletion results is performed in the same way.

The saving location setting processing unit 26 executes processing relating to setting of the saving location of the subsidiary contents to be stored in the subsidiary content database 22a, beginning with determining of a saving location (URL) regarding the newly-uploaded subsidiary contents.

The encryption processing unit 27 is a member which executes processing for subjecting the subsidiary content data to be transmitted from the subsidiary content server 2 to a user terminal device 4 to predetermined encryption. Also, depending on the system operation, subsidiary content data may be encrypted and transmitted from user terminal devices 4 at the time of uploading subsidiary contents, and in this case, the encryption processing unit 27 is arranged to execute processing for decrypting the encryption thereof as well.

The network interface 29 is a member for performing communication via the network NW. Reception of uploaded subsidiary contents and download requests for example, and transmission of subsidiary content data corresponding to download requests (subsidiary content playback control files) are realized by the network interface 29 executing communication processing in accordance with the control of the control unit 21.

Figure 8:
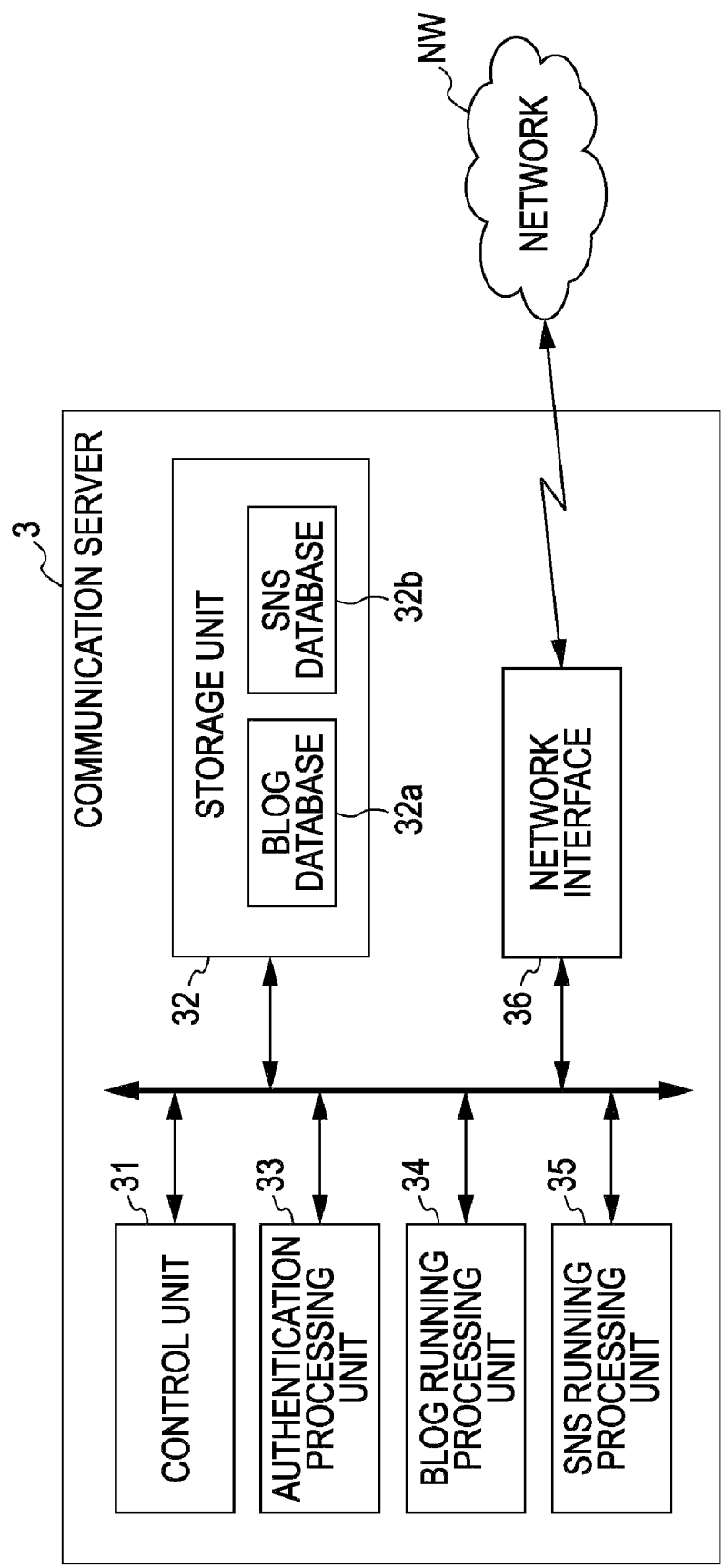
FIG. 8 is a diagram illustrating an internal configuration example of a communication content server.

FIG. 8 illustrates an internal configuration example of the communication server 3. As shown in the drawing, the communication server 3 includes a control unit 31, an a storage unit 32, authentication processing unit 33, a blog running processing unit 34, an SNS running processing unit 35, and a network interface 36. Note that the communication server 3 in this case provides communication services with blogs and SNSs.

The control unit 31 is a member which centrally executes various types of control processing in the communication server 3.

The storage unit 32 is configured having an HDD or the like for example, and stores a blog database 32a and SNS database 32b. For example, the blog database 32a is information increments wherein data of a blog which the user has started have been databased. The SNS database 32b is information increments wherein page contents and the like of each SNS user have been databased.

The authentication processing unit 33 in this case executes authentication processing in response to logins for updating blogs, requests for SNS logins, and so forth, using the user ID and password and the like included in the requests. In the event that the authentication processing results are OK, the above login is successful.

The blog running processing unit 34 executes various types of predetermined processing for properly running a blog. For example, processing is executed such as transmission of blog screen data, transmission of blog posting screens, and so forth, in response to blog access requests from user terminal devices 4, valid blog posting screen requests, and so forth. Also, processing for managing the blog database 32a, such as updating the blog database 32a such that posts to the blog are reflected, is also executed.

In the same way, the SNS running processing unit 35 executes processing for properly running an SNS, such as processing for transmission of data of a page in response to SNS page access requests and database management beginning with updating the SNS database 32b such that posts such as diaries are reflected, and so forth.

The network interface 36 is a member for performing communication via the network NW. This enables transmission of page data in response to access requests for blogs and SNSs, and so forth.

Note that while the communication server 3 is provided corresponding to SNSs and blogs, but separate servers may be configured for SNSs and blogs, for example. Also, a configuration may be made to provide more basic CGM related services, such personal sites and homepages, for example.

Figure 9:
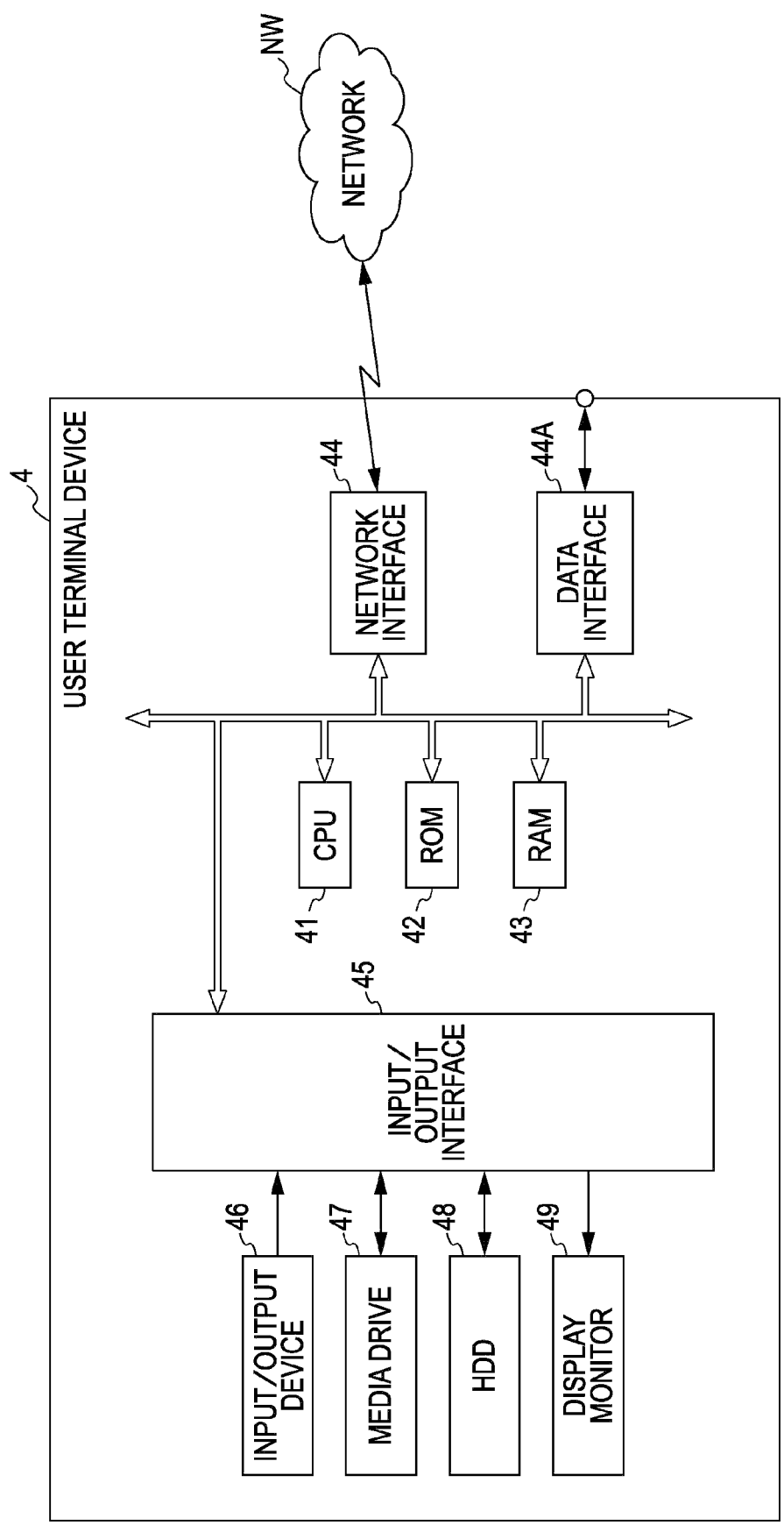
FIG. 9 is a diagram illustrating an internal configuration example of a user terminal device.

FIG. 9 illustrates an internal configuration example of the user terminal device 4. Note that in this case, the hardware serving as the user terminal device 4 is a personal computer.

First, the user terminal device 4 has a network interface 44 in order to perform communication via the network NW. Due to this network interface 44 having been provided, the user terminal device 4 can communication with, for example, the original audio content server 1, the subsidiary content server 2, the communication server 3, and other user terminal devices 4 and so forth, via the network NW.

A CPU (Central Processing Unit) 41 is capable of executing various types of processing following an OS (Operating System) and various types of applications programs installed in an HDD (hard disk drive) 48 for example, and programs held in ROM 42. With the present embodiment, an application program serving as the music editing/sharing application 100 is to be installed.

RAM 43 is a work area for the CPU 41, and suitably holds data and programs and the like for the CPU 41 to execute various types of processing.

An input/output interface 45 in this case has an input device 46 which is a keyboard or mouse or the like for example connected thereto, with operation signals being output from the input device 46 being converted into signals suitable for the CPU 41 and output to the CPU 41.

Also, the input/output interface 45 has a media drive 47 connected thereto. This media drive 47 is a drive device configured such that data can be recorded to and played from removable media of a predetermined format.

Also, the input/output interface 45 has connected thereto an HDD 48 having a hard disk as a storage medium. The CPU 41 is arranged so as to be able to record or read out data and programs and the like to and from the hard disk of the hard disk drive 48, via the input/output interface 45.

Also, a display monitor 49 for displaying images is also connected to the input/output interface 45.

A data interface 44A is a member for executing data communication with an external device via a predetermined data interface. Examples of interface standards which the data interface 44A actually handles include USB (Universal Serial Bus), IEEE (the Institute of Electrical and Electronic Engineers) 1394, and for wireless standards, include Bluetooth, IrDA (Infrared Data Association), and so forth.

Figure 10:
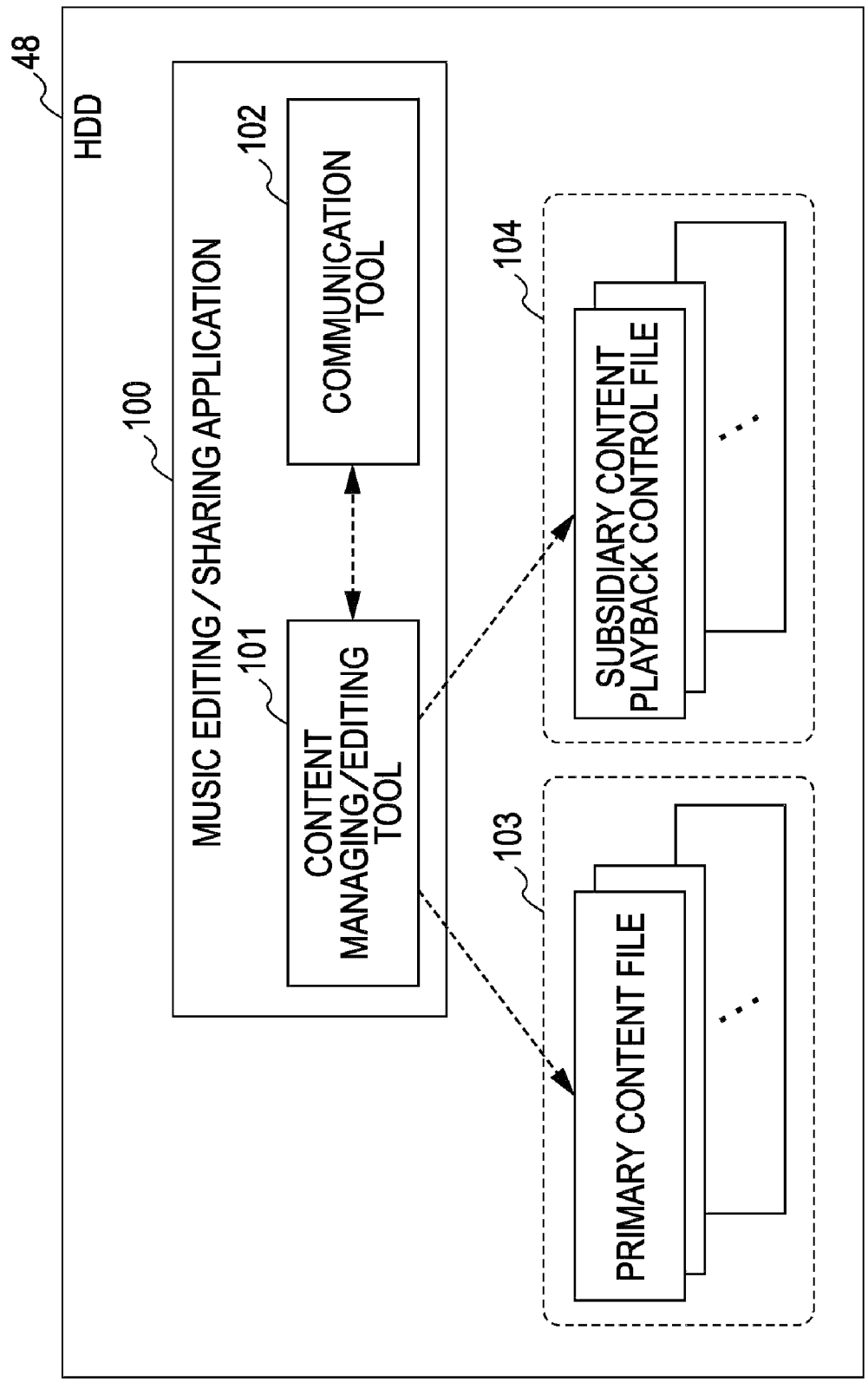
FIG. 10 is a diagram illustrating an example of information contents to be stored in an HDD of the user terminal device.

FIG. 10 illustrates a data content example stored in the HDD 48 with relation to usage of the music editing/sharing system according to the present embodiment.

As shown in this drawing, with relation to the music editing/sharing system according to the present embodiment, first, the music editing/sharing application 100 is stored as data of an application program. Note that storing of the music editing/sharing application 100 as to the HDD 48 is performed by installation processing. Also, as application files, a primary content file group 103 configured of one or more primary content files, and a subsidiary content playback control file group 104 configured of one or more subsidiary content playback control files, are stored under the control of the music editing/sharing application 100. The primary content files making up the primary content file group 103 are files which are original audio content data stored in the HDD 48 provided with a later-described common primary content ID, so as to be capable of being handled as primary contents.

The music editing/sharing application 100 in this case can be viewed functionally as being generally configured of a program portion serving as a content managing/editing tool 101 and a program portion serving as a communication tool 102). The content managing/editing tool 101 is arranged to execute downloading of primary content files (configured of audio data and metadata) and subsidiary content playback control files, and file operations with regard to primary content files of the primary content file group 103 and subsidiary content playback control files of the subsidiary content playback control file group 104. Also executed are editing processing in accordance with editing operations, subsidiary content playback control file creating processing in response to editing results, and so forth. The communication tool 102 executes processing for accessing the communication server 3 and operating blogs and SNSs.

Figure 11:
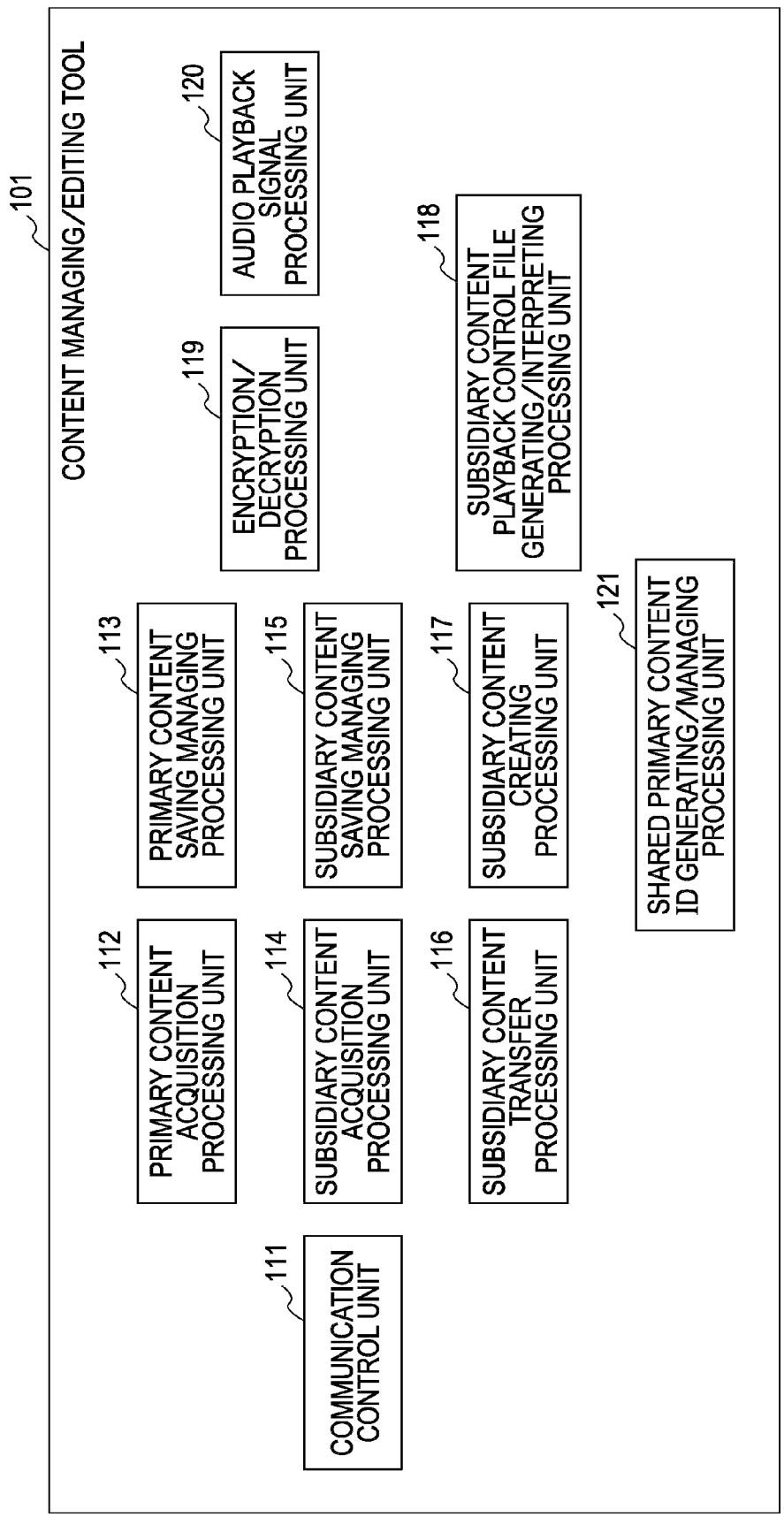
FIG. 11 is a diagram illustrating a program configuration example serving as a content editing management tool of a music editing/sharing application.

FIG. 11 is a schematic representation of the program configuration with regard to the content managing/editing tool 101 in increments of function blocks, and can be viewed of being made up of a communication control unit 111, a primary content acquisition processing unit 112, a primary content saving managing processing unit 113, a subsidiary content acquisition processing unit 114, a subsidiary content saving managing processing unit 115, a subsidiary content transfer processing unit 116, a subsidiary content creating processing unit 117, a subsidiary content playback control file generating/interpreting processing unit 118, an encryption/decryption processing unit 119, an audio playback signal processing unit 120, a primary content ID generating/managing processing unit 121, and a subsidiary content ID generating/managing processing unit 122, as shown in the drawing.

The communication control unit 111 is a member made up primarily of programs for executing communication between the original audio content server 1 and subsidiary content server 2 with relation to content management/editing via the network.

The primary content acquisition processing unit 112 is a member made up of programs for downloading and acquiring primary contents (original audio contents). The primary content acquisition processing unit 112 provides a user interface for downloading primary contents. Also, control for issuing commands as download requests and causing transmission by the communication control unit 111, processing for receiving handover of packets of the primary content data received at the communication control unit 111 and restoring to the data format as primary contents and so forth, are also executed by this primary content acquisition processing unit 112.

The primary content saving managing processing unit 113 is a member for executing processing for saving the primary content files acquired by the primary content acquisition processing unit 112 in the HDD 48, and processing for managing the saved primary content files. For example, the primary content saving managing processing unit 113 realizes tune management such as sorting in accordance with artist name, album units, genre, and so forth.

The subsidiary content acquisition processing unit 114 is a member made up of programs for downloading and acquiring subsidiary contents.

The subsidiary content saving managing processing unit 115 is a member for executing processing for saving subsidiary content playback control files acquired by the subsidiary content acquisition processing unit 114 in the HDD 48, and processing for managing the saved subsidiary content playback control files.

The subsidiary content transfer processing unit 116 executes processing such that transfer processing for uploading subsidiary content playback control files to the subsidiary content server 2 via the communication control unit 111 is executed properly.

The subsidiary content creating processing unit 117 is a member for executing processing relating to editing using the editing material contents shown in FIG. 3, i.e., creating of tune contents serving as subsidiary contents. For example, a user interface for editing operations and so forth is also realized by this subsidiary content creating processing unit 117.

The subsidiary content playback control file generating/interpreting processing unit 118 first executes processing for generating subsidiary content playback control files in which the tune contents serving as subsidiary contents created by the subsidiary content creating processing unit 117 are reflected. Also, in the event of playing subsidiary contents, interpretation processing is executed regarding the subsidiary content playback control file shown in FIG. 4, and a playback processing sequence using the editing material contents is determined.

With the present embodiment, primary content files are encrypted and transmitted from the original audio content server 1. Also, encryption is implemented at the time of transmitting subsidiary content playback control files from the subsidiary content server 2 to a user terminal device 4 (downloading). Also, there are cases of sending out with encryption in the case of uploading subsidiary content data from a user terminal device 4 to the subsidiary content server 2. The encryption/decryption processing unit 119 executes processing for decrypting encryption in the event that a primary content file or a subsidiary content playback control file that has been encrypted is used for operations for playing, editing, or the like. Also, processing for executing encryption is executed to perform encryption on the subsidiary content playback control file and transmit, if this is the case.

The audio playback signal processing unit 120 is a member for executing, in the signal processing process for playing digital audio data as audio, predetermined signal processing which should be carried out at the digital signal format stage. For example, regarding playing of a primary content file, in the event that this primary content file has been subjected to compression encoding, decoding processing corresponding to this compression encoding is performed, so as to obtain a digital audio signals with a predetermined PCM format, for example. Also, in the event of playing subsidiary contents, this executes playing processing serving as a sequencer, wherein the data portions of the primary content files serving as editing material contents are played following the sequence of playing processing determined by the aforementioned subsidiary content playback control file generating/interpreting processing unit 118.

Now, at the time of playing subsidiary contents, the results of interpretation of the playback control information by the subsidiary content playback control file generating/interpreting processing unit 118 can be reflected in an editing work screen which is a GUI provided by the subsidiary content creating processing unit 117. That is to say, the contents of playback instructions indicated by the playback control information can be displayed in a form which the user can recognized, on the editing work screen. The user can confirm in detail how that subsidiary contents was created, by viewing this. This means that how the creator created the subsidiary content can be obtained as accurate information. For example, in the case of contents in digital audio signals, in order for a general user to tell how the content has been created, only estimation can be made from the acoustic content which can be actually played and listened to. In comparison with this, in the case of the present embodiment, how the subsidiary content has been created can be comprehended in further detail and more specifically. Sharing such subsidiary content among users can be expected to markedly improve the knowledge and skill of users using the music editing/sharing system according to the present embodiment with regard to music production. The system according to the present embodiment has extremely high entertainment nature and usage value for users with interest in music production.

Also, the shared primary content ID generating/managing processing unit 121 executes predetermined processing relating to later-described shared primary content IDs, such as generating shared primary content IDs, assigning generated shared primary content IDs, and so forth.

The subsidiary content ID generating/managing processing unit 122 executes processing for generating a later-described subsidiary content ID, and predetermined processing relating to the generated subsidiary content ID.

Next, a structure example of a subsidiary content playback control file will be described with reference to FIG. 12.

As shown in the drawing, a subsidiary content playback control file is generally made up of a file main portion and metadata portion. Also, the file main portion is made up of a header block, content block, and attribute information block.

First, in the file main portion, the header block is the header portion of the current subsidiary content playback control file, and accordingly primarily stores predetermined information having comprehensively significant content relating to the current file. Here, the current subsidiary content ID, application information, content type status, and so forth are shown as information stored in the header block. The current subsidiary content ID is a subsidiary content ID to be correlated to the current subsidiary content playback control file (to be provided) as an identifier for identifying the subsidiary content playback control file (subsidiary content ID).

Also, in the header block, application information is made up of predetermined information relating to the application which has created the current subsidiary content playback control file, for example. For example, this is made up of information such as the name, version, and so forth, of the application.

The content type indicating which of pre-classified types the subsidiary content serving as the current subsidiary content playback control file falls under.

The status is information indicating which state of pre-defined states the current subsidiary content playback control file is in.

At least playback control information is stored in the content block. This playback control information (content block) is true main entity information as the subsidiary content playback control file (main portion information). Information included in the regions other than the content block excluding the header block (attribute information block, metadata portion) is added information to the above main portion information.

The playback control information is information made up describing a processing sequence for playing tune contents serving as current subsidiary content, in a predetermined language. Elements of the description contents forming this playback control information include, for example, first, a description indicating primary content serving as actual audio data used for playback, description indicating a data portion to be used for actual playing subsidiary content from the audio data serving as this primary content, and description indicating the time for playing this data portion. Also, description for applying effects or special effects, such as fade-in, fade-out, overlap, equalizing (tone adjustment), playback speed rate, reverberation, delay, and so forth, for example, is performed.

Also, the attribute information block includes at least usage primary contents information, usage editing material content information, and present content usage agreement range information.

The usage primary contents information is information indicating which primary contents are used for playing the tune contents serving as the subsidiary content which is the current subsidiary content playback control file (these are the usage primary contents). In other words, this is information indicating which primary contents have been consequently used for creating the current subsidiary content.

In correlation with FIGS. 5A though 5C, the information indicating the primary contents shown as forming the subsidiary content newly created by editing processing is the above-described usage primary contents information. That is to say, in the case of FIG. 5A, the primary contents A and B are shown in the usage primary contents information, in the case of FIG. 5B, the primary contents A, B, and C are shown, and in the case of FIG. 5C, the primary contents C, D, E, and F are shown.

Note that the primary content ID is used for indicating the usage primary contents in the usage primary contents information. The primary content ID is generated based on the audio feature amount, as described later.

Also, as described earlier, as for the tune contents serving as the subsidiary content created editing the editing material content, there may be a possibility that a certain primary content included in the editing material content will be deleted. With the example of the case in FIG. 5B, with the new subsidiary content obtained by performing editing using the editing material contents A and B for example, there may be a possibility that the tune contents will be that which uses the primary contents A and C as sound sources, but not using the element of the primary content D. In this case, only the primary content A and C are audio data of primary contents used for playing the subsidiary content, and the primary content D is unused.

With regard to how the contents of the usage primary content information should be corresponding to such a case, there can be conceived one arrangement wherein the contents are such that only the primary contents A and C are shown and the primary content D is not presented, based on the idea that only primary contents actually used for playing the subsidiary content should be reflected.

As for another, there can be conceived another arrangement wherein the contents are such that all of the primary contents A, C, and D are shown. That is to say, this is based on an idea wherein, in this case, while the primary content D is not actually used, there has been the influence of the tune contents serving as the primary content D to a certain extent in the process of creating the subsidiary content, and accordingly is equivalent to being used in an underlying manner. In this case, all primary contents which have been used even once up to the generation of the subsidiary content created this time are consequently included in the usage primary content information.

The usage editing material content information is information indicating which editing material contents (usage editing material contents) have been directly used for creating the subsidiary content to which the current subsidiary content playback control file corresponds. With the example in FIGS. 5A through 5C, shown in the usage editing material content information of the subsidiary content following the editing processing shown in FIG. 5A is information indicating the actual primary content files serving as the editing material contents A and B. Also, stored in the usage editing material content information of the subsidiary content following the editing processing shown in FIG. 5B is information indicating the primary content file serving as the editing material content A, and the subsidiary content serving as the editing material content C (subsidiary content playback control file).

Note that the usage editing material content information also has attached information of related predetermined contents for each of the editing material contents shown here.

The present content usage agreement range information is information of a usage agreement range set regarding the current subsidiary content. The structure and definition contents there should comply with the usage agreement range information of the configuration example of usage contents described next with FIGS. 13 and 14.

Figure 12:
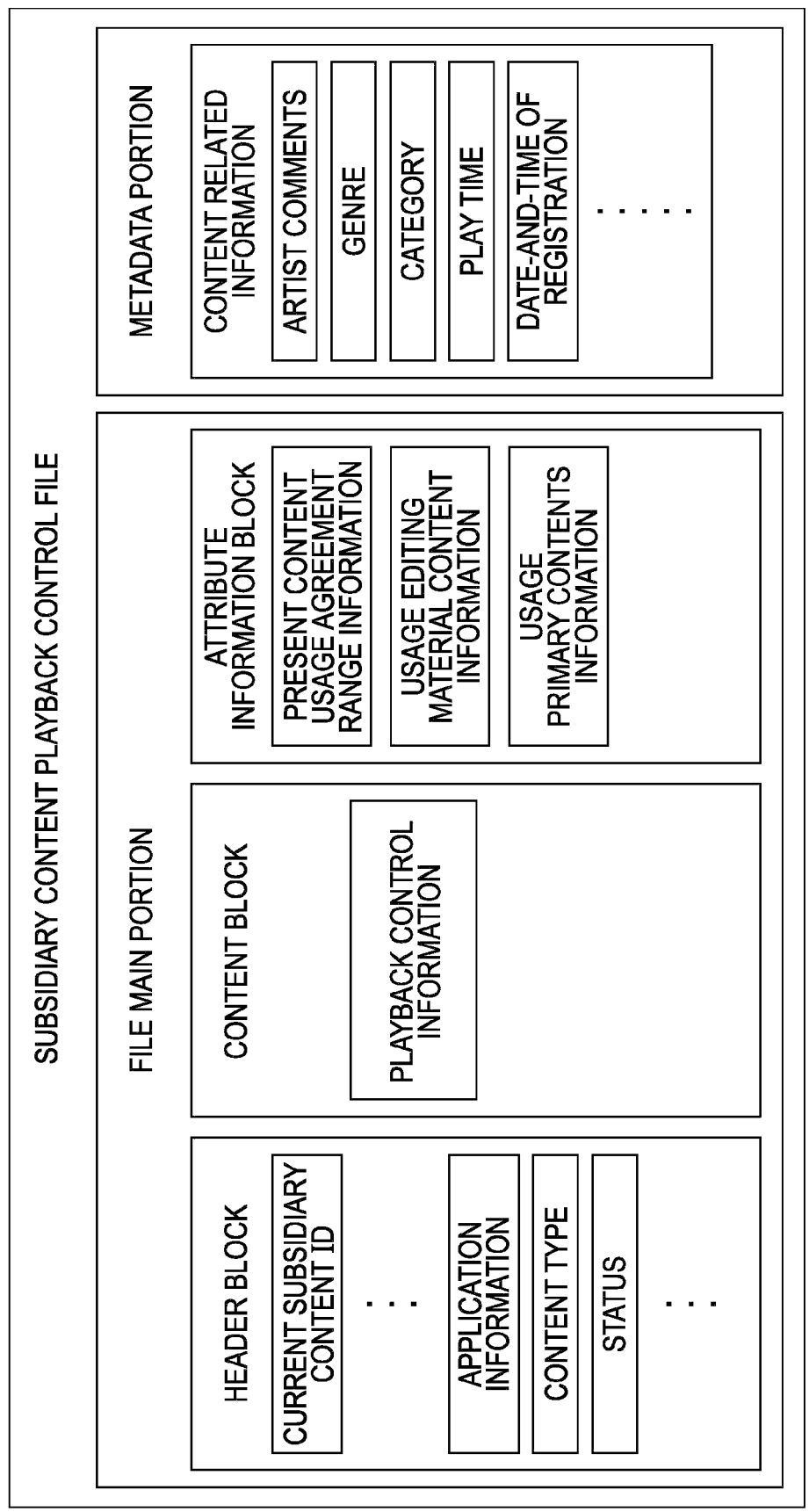
FIG. 12 is a diagram schematically illustrating a configuration example of a subsidiary content playback control file.

In FIG. 12, the metadata portion stores at least content related information. The content related information is configured further storing metadata related to the subsidiary content to which the current subsidiary content playback control file corresponds, such as artist comments, genre, category, play time, date-and-time of registration, and so forth, as shown in the drawing, for example.

FIG. 13 illustrates a structure example of usage primary contents information. As shown in this drawing, the usage primary contents information is generally made up by linked unit file information. Each unit file information corresponds with a single usage primary content.

Information items of shared primary content ID, artist name, tune name, and usage agreement range information are provided with the unit file information, for example.

The shared primary content ID (versatile identification information) is an identifier assigned to each primary content corresponding to one tune for example, and uniquely indicates which usage primary content corresponds to that unit file information, by the shared primary content ID within the unit file information.

This shared primary content ID is generated by the shared primary content ID generating/managing processing unit 121. In order to generate the value of this shared primary content ID, predetermined computation and processing applying audio feature amount analysis processing is performed, using the digital audio signals stored in the file serving as the original audio content stored in the HDD 48. The shared primary content ID obtained in this way is uniquely set in correspondence with the contents of the audio obtained by generating the audio contents. In other words, a shared primary content ID is shared as long as the contents of the audio obtained by playback are the same, regardless of differences in format (digital audio signal format, file format), and so forth, having versatility among content data having the same contents but different audio sources or formats.

The artist name information item indicates the name of the performer or creator who has played or created the corresponding usage content.

The tune name information item indicates the tune name of the corresponding usage content.

The information of the usage agreement range (usage agreement range information) is formed of a group of one or more usage items 1 through n.

The usage items 1 through n are assigned such that predetermined usage contents related to editing correspond to each. Examples of usage contents to be appropriated to usage items which can be conceived include the following.

Contents relating to whether or not secondary usage of the present content is permitted Contents relating to using contents of another artist from the present contents, with regard to other contents to be used as editing material Contents relating to using contents of another album from that to which present contents belong, with regard to other contents to be used as editing material Contents relating to using particular effects and special effects Contents relating to using particular plug-in modules Extracting a part from the entire tune and using as editing material Permission contents relating to extracted audio data portion in the event of extracting a part from the entire tune and using as editing material Number of usable generations (for example, in the event of permitting use for two generations, i.e., up to the grandchild generation, as primary content, child subsidiary content using this primary content and grandchild subsidiary content using the subsidiary content can be created, but the grandchild subsidiary content is uneditable with regard to the portion using the corresponding usage contents)

Contents relating to number and type of contents regarding which secondary use can be performed in combination with the present content Information indicating contents relating to usage authorization set for each usage item, beginning with permitted/not-permitted for example, is described for each of the these usage items. As for the information of the usage agreement range, generalizing the usage setting contents described for each of these usage items indicates the usage agreement range for the corresponding usage primary content.

FIG. 14 illustrates a structure example of usage editing material contents information.

As shown in the drawing, the structure of the usage editing material contents information in this case confirms to the structure of the usage primary content information shown in FIG. 13. However, in the case of usage editing material contents, there are cases of being primary contents, and cases of being subsidiary content. Accordingly, in the event that the corresponding content is a primary content, the shared primary content ID of the primary content is stored in the ID region for the increment file information, and if a subsidiary content, a subsidiary content ID which is the ID of the subsidiary content is stored.

Note that distinction of shared primary content ID and subsidiary ID can be determined based on a format defined regarding each ID, for example. As one example, an arrangement may be conceived wherein ID type identification information (or information equivalent thereto) indicating whether the ID is a shared primary content ID or subsidiary content ID is stored in a predetermined position in the data string making up each of the shared primary content ID and subsidiary content ID, so as to be determinable by this ID type identification information. Or, in the event that the size of the shared primary content ID and subsidiary content ID differ, determination may be made based on the difference in size thereof.

FIG. 15 illustrates an example of contents of playback control information in a subsidiary content playback control file.

In this drawing, the description portion between the brackets [ ] indicates the playback control content of sections temporally consecutive, using one primary usage content (section playback control content).

An example of playback control content of a usage primary content unit shown in FIG. 15 will be described.

First, as for the section playback control content shown at the head in the drawing, [file_id=AAAAAA; time=00:00-00:10; position=vv-zz] is described. This specifies that the usage primary content is specified by the shared primary content ID=AAAAAA, and that the play time of the current subsidiary content using this usage primary content is 00:00 (start time)-00:10 (play time 10 seconds), and that the data section of the usage primary content used during this play time is a range corresponding to address vv through address zz.

For the subsequent section playback control content, [file_id=AAAAAA; time=00:10-00:15; position=ss-tt] is described. This specifies that the usage primary content is specified by the shared primary content ID=AAAAAA, and that the play time of the current subsidiary content using this usage primary content is 00:10-00:15, and that the data section of the usage primary content used during this play time is a range corresponding to address ss through address tt.

For the subsequent section playback control content, [file_id=BBBBBB; time=00:15-00:20; position=pp-uu] is described. This specifies that the usage primary content is specified by the shared primary content ID=BBBBBB, and that the play time of the current subsidiary content using this usage primary content is 00:15-00:20, and that the data section of the usage primary content used during this play time is a range corresponding to address pp through address uu.

For example, the audio playback signal processing unit 120 of the music editing/sharing application 100 according to the present embodiment thus sequentially interprets the playback control contents of the usage content units in the brackets [ ], and executes actual playback control in accordance with the interpretation results, thereby playing and outputting the subsidiary content as audio signals.

Figure 16:
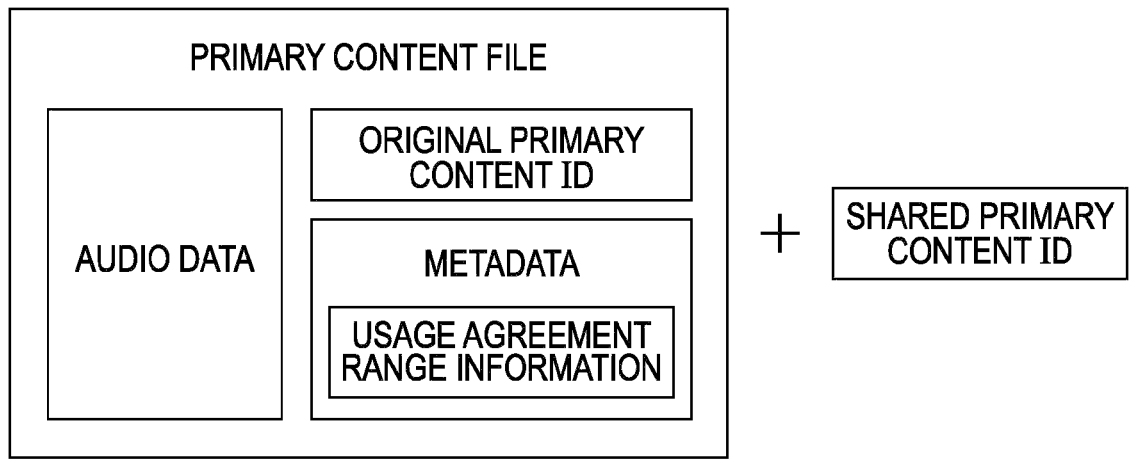
FIG. 16 is a diagram schematically illustrating a configuration example of a primary content file.

Also, the structure of a primary content file will be described. Though described earlier, a primary content file has a file structure made up of audio data of a predetermined format having tune (audio) contents serving as primary content, and various types of metadata related thereto, as shown again in FIG. 16. The data content of the primary content file is the content of the original audio data, obtained by acquisition of data by downloading or from an external device for example, to the HDD 48, which has been passed on. Accordingly, the primary content file also includes an original content ID, which is an identifier corresponding to the original audio content. Thereupon, the audio data file handled as the primary content has the above-described shared primary content ID, added or correlated thereto, as shown in the drawing.

Note that as for audio data formats, there are already various formats available. For example, the PCM format which uses predetermined sampling frequency and quantization bits, audio compression encoding methods, formats compression-encoded by bit rate, and further, a format of 1-bit signals subjected to PDM (pulse-density modulation) obtained by ΔΣ modulation, as typified in DSD (Direct Stream Digital) or the like, for example. As described later, for the shared primary content ID defined in the present embodiment, even if these formats differ at the audio data portion, the same primary content ID is assigned in common if a content file of the same audio content, as can be understood from description given earlier.

Also, as for the types of the above-described metadata, in addition to information generally attached to audio data, such as tune title, artist, album, genre, data format, data size, and so forth, the usage agreement range information described with FIG. 13 for example, may also be included.

While acceptance of subsidiary usage of the primary content is assumed with the present embodiment, this acceptance of usage is obtained by agreement with the copyright holder of the primary content (e.g., artist or the like). This means that the content and range of usage and so forth which the copyright holder can agree on naturally changes depending on the way the copyright holder thinks about the tune. Accordingly, with the present embodiment, usage agreement range information which is information setting the usage agreement range is built in as metadata for the primary content as well, in order to respect the way such copyright holders think, thereby reflecting the intent of the copyright holder. Of course, as a system of operation, the usage agreement range information could be set uniformly for all primary contents, but an arrangement as with the present embodiment wherein different usage agreement ranges can be set for each primary content so as to reflect the intent of the copyright holder is more effective in smoothly operating the music editing/sharing system.

Note that the contents of usage items making up the usage agreement range information in the metadata of the primary content file do not have to agree with the subsidiary content playback control file shown in FIGS. 13 and 14, and that it is sufficient for the content of the usage items used as a primary content to be set.

Next, an example of procedures relating to the primary processing relating to editing of subsidiary contents will be described with reference to the flowcharts in FIGS. 17 and 18. Note that the processing shown in FIGS. 17 and 18 is realized by the CPU 41 executing a program serving as the content managing/editing tool 101 in the music editing/sharing application 100, for example.

Now, let us say that for example, a user of a user terminal device 4 has activated the content managing/editing tool 101 of the music editing/sharing application 100 and is ready to edit subsidiary content. Let us say that operations are performed such that content to use as material for creating subsidiary content is searched, and this is registered (finalized) as editing material content. In accordance with this, the processing shown in FIG. 17 is executed by the subsidiary content creating processing unit 117 of the content managing/editing tool 101.

Figure 17:
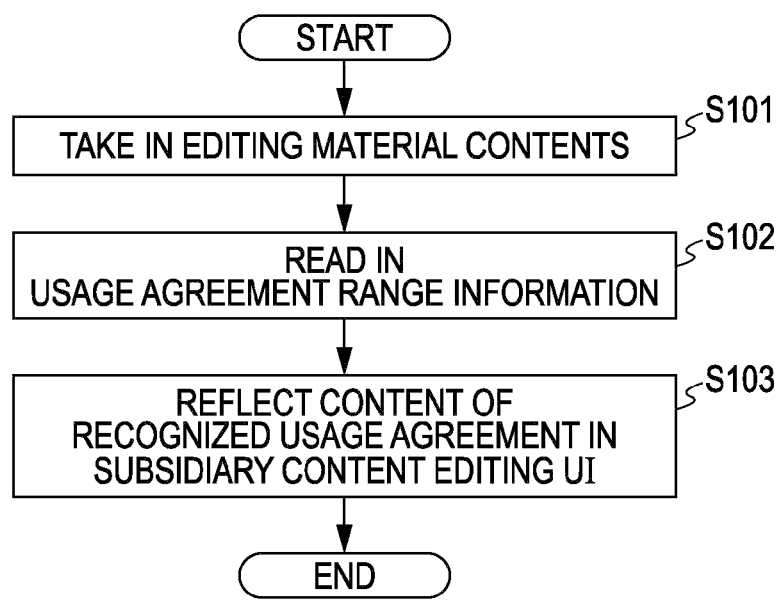
FIG. 17 is a flowchart illustrating an example of processing procedures whereby the music editing/sharing application reflects usage agreement range settings of editing material contents on a user interface, at the time of subsidiary content editing processing.
Figure 18:
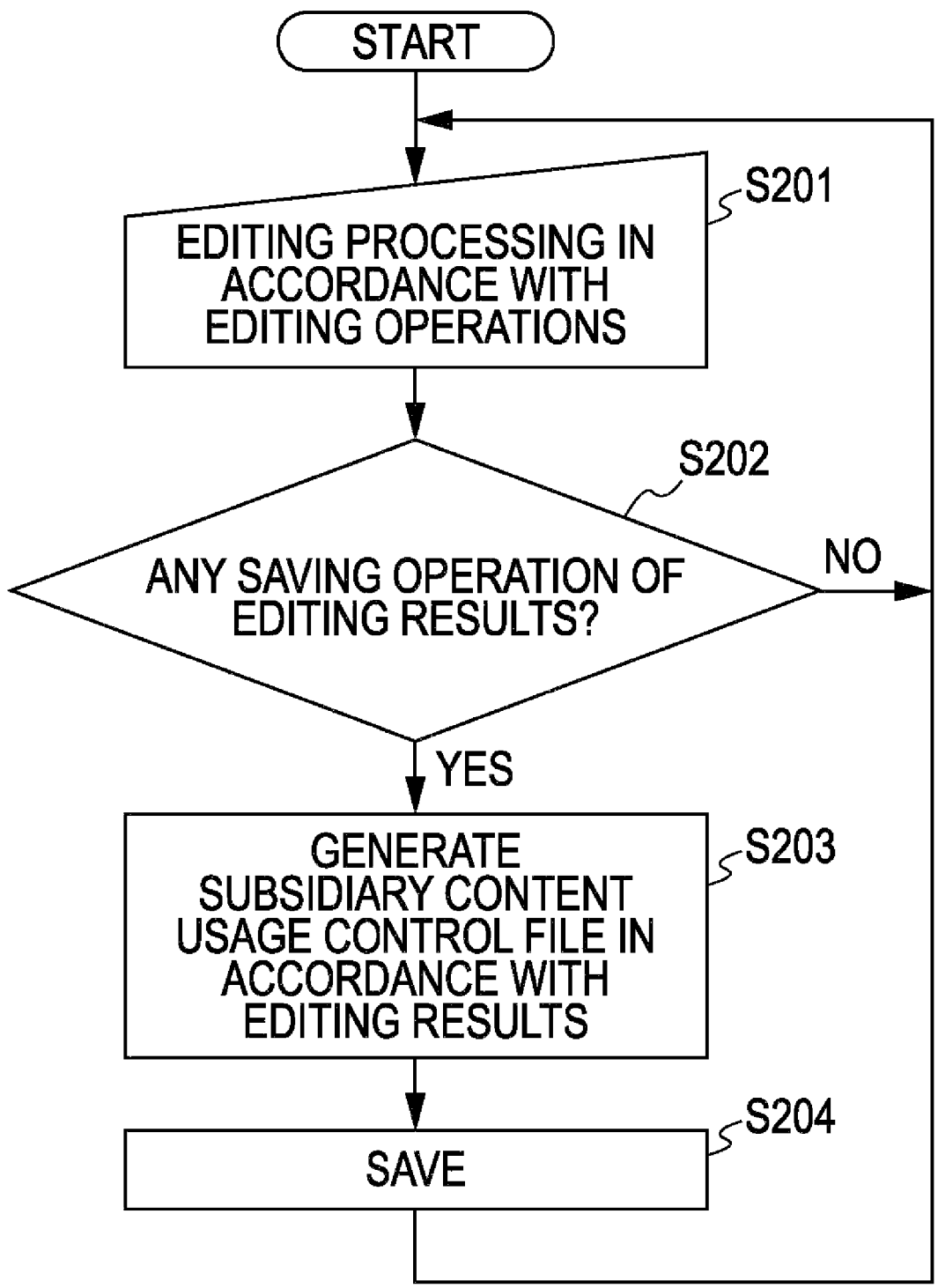
FIG. 18 is a flowchart illustrating an example of processing procedures up to the music editing/sharing application creating a subsidiary content playback control file as subsidiary content editing processing.

In FIG. 17, first, in step S101, taking in of data of content registered as editing material content is executed. Note that in the event that the registered editing material content is a primary content, the data of the file which is the primary content is taken in, and in the event of a subsidiary content, the data of a subsidiary content playback control file corresponding thereto is taken in.

In step S102, reading in of information of the usage agreement range is further executed from the data taken in by the above step S101. Thus, various contents relating to the usage agreement set with regard to the content registered this time as editing material content is recognized based on the content of the usage items 1 through n in the usage agreement range information. Accordingly, in the following step S103, the contents of the usage agreement recognized in correspondence with the above step S102 is set so as to be reflected on a user interface (UI) for subsidiary content editing. Due to this processing, the subsidiary content creating processing unit 117 provides an environment wherein editing operations of contents exceeding the usage agreement range set in the editing material content beforehand are not performed.

FIG. 18 illustrates a basic processing procedure example relating to generating of a subsidiary content playback control file which is the actual data serving as the subsidiary content. The processing shown in this drawing is also realized by the CPU 41 executing a program serving as the content managing/editing tool 101, for example.

Here, first in step S201, appropriate editing processing in accordance with operation input for editing is executed. For example, the subsidiary content creating processing unit 117 provides a GUI (Graphical User Interface) for the user to perform editing operations for creating subsidiary content, with the program thereof. The user performs editing operations for creating subsidiary content using this GUI, and the processing in step S201 is executed in accordance with this operation.

In the process of performing editing processing as described above, upon determination being made in step S202 that operations have been performed for saving the editing results so far, the flow proceeds to step S203. In step S203, a content block is generated including playback control information corresponding to the tune content serving as the subsidiary content obtained by the editing results so far, and thereupon, a header block, and attribute information block which are also members in the file main unit portion, and a metadata portion, are also created, and finally a subsidiary content playback control file is generated. Control is then executed in the next step S204 so as to save this subsidiary content playback control file in an appropriate directory in the HDD 48 for example. Upon the procedure of step S204 having ended, the flow returns to step S201.

Note that while not shown in the drawing here, the processing shown in this drawing is left and the flow transits to other required processing, in response to operations being performed to close the GUI screen for creating subsidiary content for example, or the like.

Also, with regard to creating a subsidiary content playback control file, the contents of present content usage agreement range information will be created. As for how to set the contents of the present content usage agreement range information, an arrangement may be conceived to automatically set (contents for each usage item) following predetermined rules, in a range not exceeding a minimum determined summarizing the usage agreement range information for each primary content which is the source editing material, for example. Also, an arrangement may be conceived for settings are made corresponding to specification operations relating to the contents of the present content usage agreement range information which the user has performed, so that the intent of the user is reflected. However, even in the event of setting in accordance with user operations in this way, setting is performed in a range not exceeding a minimum determined summarizing the usage agreement range information for each primary content which is the source editing material, so that setting of usage agreement range (contents for each usage item) exceeding this is not performed.

Figure 19:
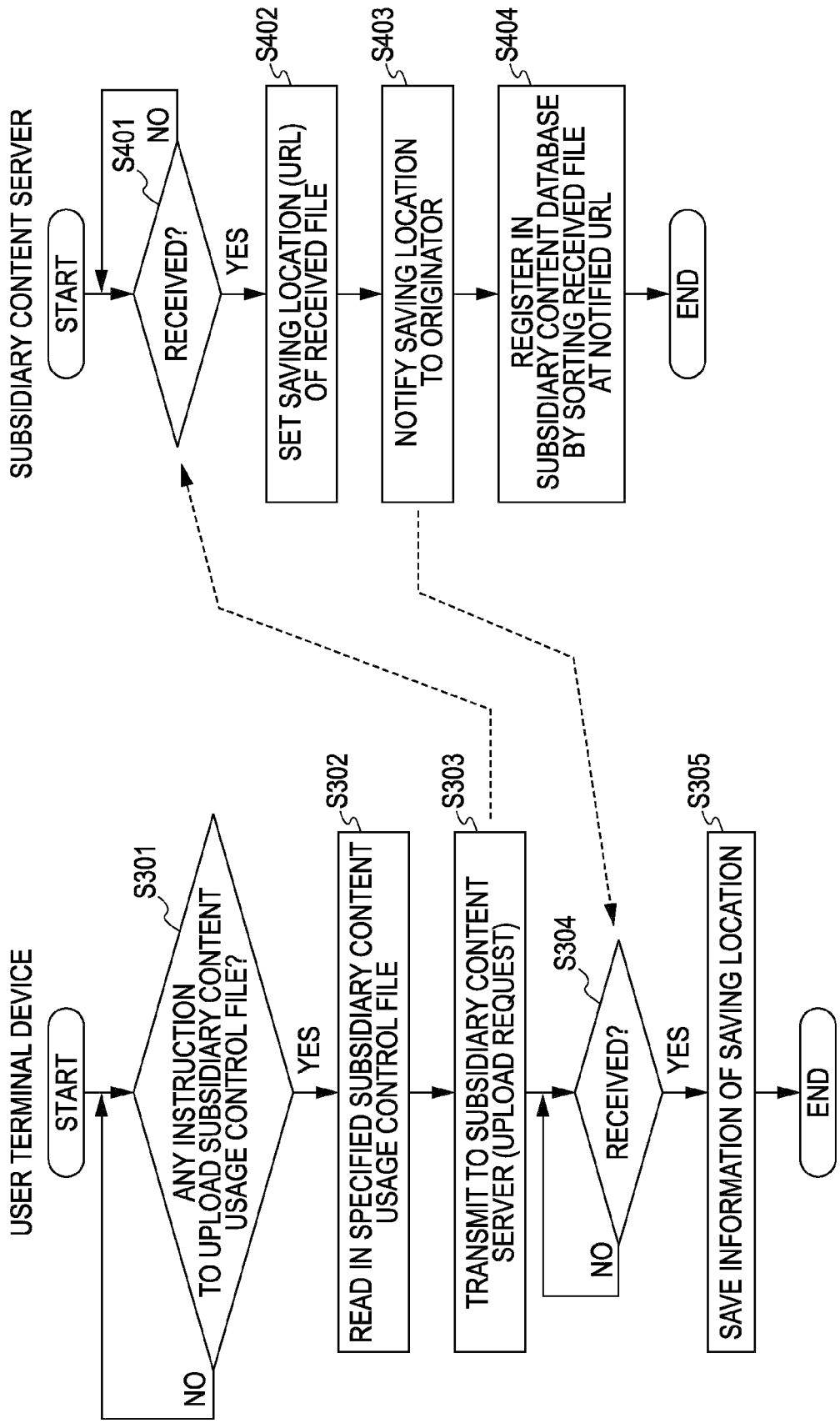
FIG. 19 is a flowchart illustrating an example of uploading of a subsidiary content by the user terminal device, and processing procedures at the subsidiary content server in accordance therewith.

Next, a basic processing procedure example relating to uploading of subsidiary content by the user terminal device 4, and a processing procedure example of the subsidiary content server 2 in accordance with this uploading, will be described with reference to the flowchart in FIG. 19. The processing at the user terminal device 4 side in the drawing is realized primarily by programs serving as the subsidiary content saving managing processing unit 115 and subsidiary content transfer processing unit 116. The processing at the subsidiary content server 2 is executed by the members shown in FIG. 7 operating in cooperation, but in reality, can be viewed as being realized by the computer system (CPU) making up the subsidiary content server 2 executing programs.

The user terminal device 4 side in step S301 is awaiting obtaining of a command instructing uploading of a subsidiary content playback control file. Now, let us say that the user selects, as an operation as to the GUI provided by the content managing/editing tool 101, one or more subsidiary contents regarding which uploading is desired, from the subsidiary contents created by the music editing/sharing application 100 and stored in the HDD 48 as application files of the music editing/sharing application 100 (i.e., subsidiary content playback control files), and performs an upload execution operation. In response to this, a command is generated which instructs uploading of the subsidiary content playback control file corresponding to the subsidiary content selected at the GUI, and the flow proceeds to step S302.

In step S302, the subsidiary content regarding which uploading has been specified, i.e., the subsidiary content playback control file, is read in from a predetermined directory. In the following step S303, control is executed such that the subsidiary content playback control file which has been read in is transmitted and output to the subsidiary content server 2 via network along with an upload request.

The subsidiary content server 2 is standing by in step S401 for reception of an upload request, and upon the upload request being received, the procedures from S402 and on are executed. Note that in order to actually transition to step S402 after receiving an upload request, confirmation is made that this is a request from a valid user, by way of authentication processing for example, but such processing procedures are omitted here.

In step S402, a saving location (URL) for the subsidiary content playback control file received along with the upload request is set. The functions of the saving location setting processing unit 26 at the subsidiary content server 2 for example, are used for this URL setting.

In step S403, communication processing for notifying the saving location of the uploaded subsidiary content (subsidiary content playback control file) is performed as to the user terminal device 4 which is the originator of the upload request this time.

At the user terminal device 4 side which has performed in upload request in step S303 is awaiting reception of information of the saving location in step S304. Upon receiving information of the saving location, in step S305 information of the received saving location (URL) is saved in an appropriate directory. Thus, hereafter, the information of the saving location of the subsidiary content can be called up by performing a predetermined operation as to the content managing/editing tool 101. In the event that the saving location is a URL, a text string as the URL can be output by display or the like, for example depending on the call operation.

Figure 20:
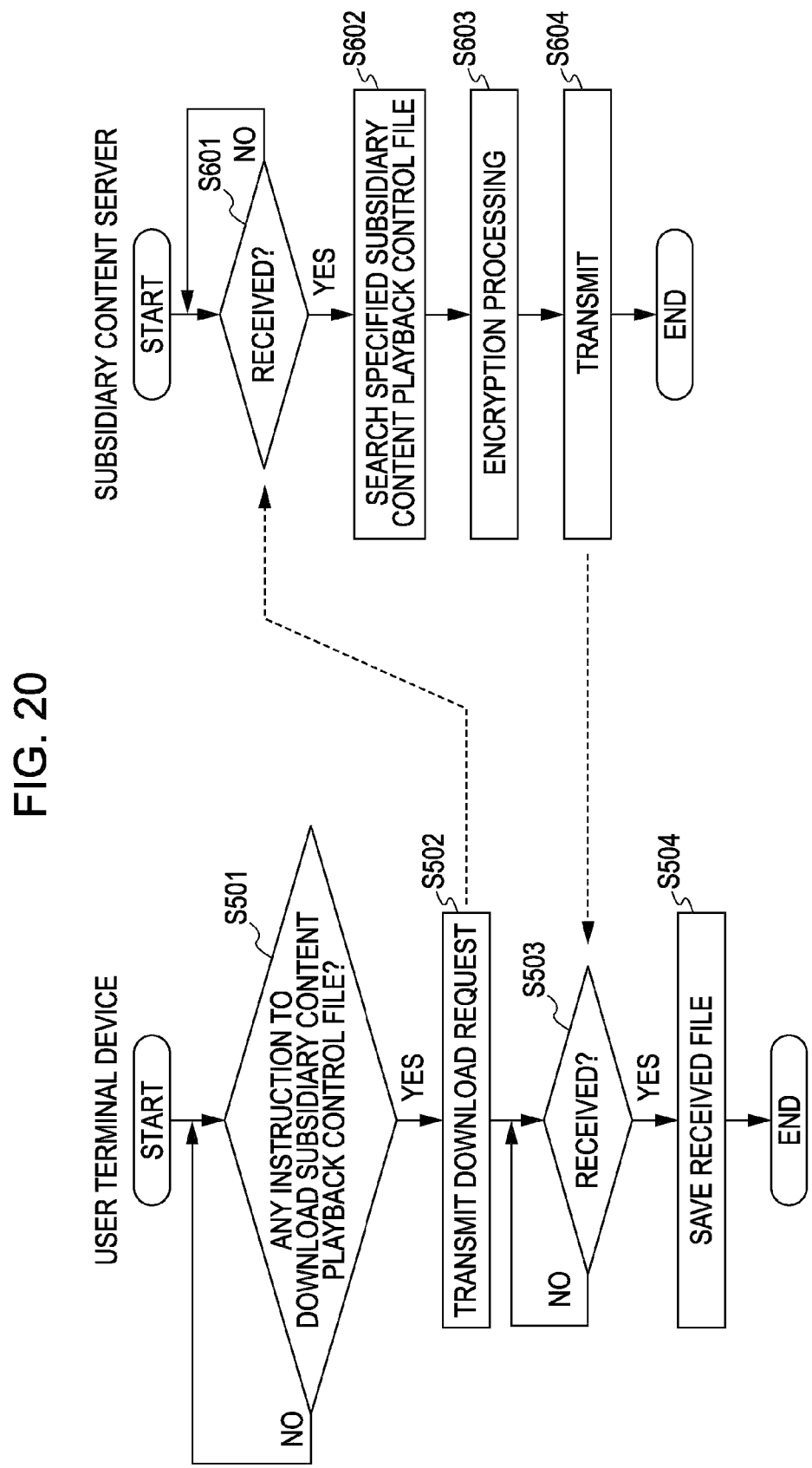
FIG. 20 is a flowchart illustrating an example of uploading of a subsidiary content by the user terminal device, and processing procedures at the subsidiary content server in accordance therewith.

The flowchart in FIG. 20 illustrates a processing procedure example relating to downloading of the subsidiary content by the user terminal device 4, and a processing procedure example at the subsidiary content server 2 corresponding thereto. The processing at the user terminal device 4 in the drawing as well is primarily realized by programs serving as the subsidiary content saving managing processing unit 115 and subsidiary content transfer processing unit 116.

First, in step S501, the user terminal device 4 side is awaiting obtaining of a command instructing downloading of a subsidiary content playback control file. Here, let us say that for example, the user accesses the subsidiary content server 2, as an operation as to the GUI provided by the content managing/editing tool 101, and in a state of browsing a list of subsidiary contents saved and managed therein, selects one or more subsidiary contents regarding which downloading is desired, and performs operations for executing downloading. In response to this, a positive determination result will be obtained in step S501, and the flow proceeds to step S502.

In step S502, a download request is transmitted to the subsidiary content server 2 in response to a download instructing having been obtained. Note that as for this download request, information for specifying the directory (saving location) of the subsidiary content selected at the time of operation of the download execution instruction for example, is also included. Note that an arrangement may be conceived wherein instead of the saving location, a download request is made specifying the subsidiary content ID provided to the subsidiary content playback control file which is the actual entity of the subsidiary content and so forth, for example.

The subsidiary content server 2 is awaiting for a download request to be received in step S601, and upon a download request being received, executes the procedures in step S602. Note that in order to actually transition to step S602 after receiving a download request as well, authentication processing and the like transpires, but such processing procedures are omitted here as well.

In step S602, the subsidiary content database 22*a* of the storage unit 22 is accessed and the specified subsidiary content (subsidiary content playback control file) is searched for, and the searched subsidiary content playback control file is encrypted in step S603 and transmitted to the requesting user terminal device 4 in step S604.

The user terminal device 4 which has transmitted the download request in step S502 awaits in step S503 for the subsidiary content playback control file according to he download request to be received. Upon determining that the subsidiary content playback control file has been received, in step S504, the received subsidiary content playback control file is saved and managed in an appropriate directory.

Figure 21:
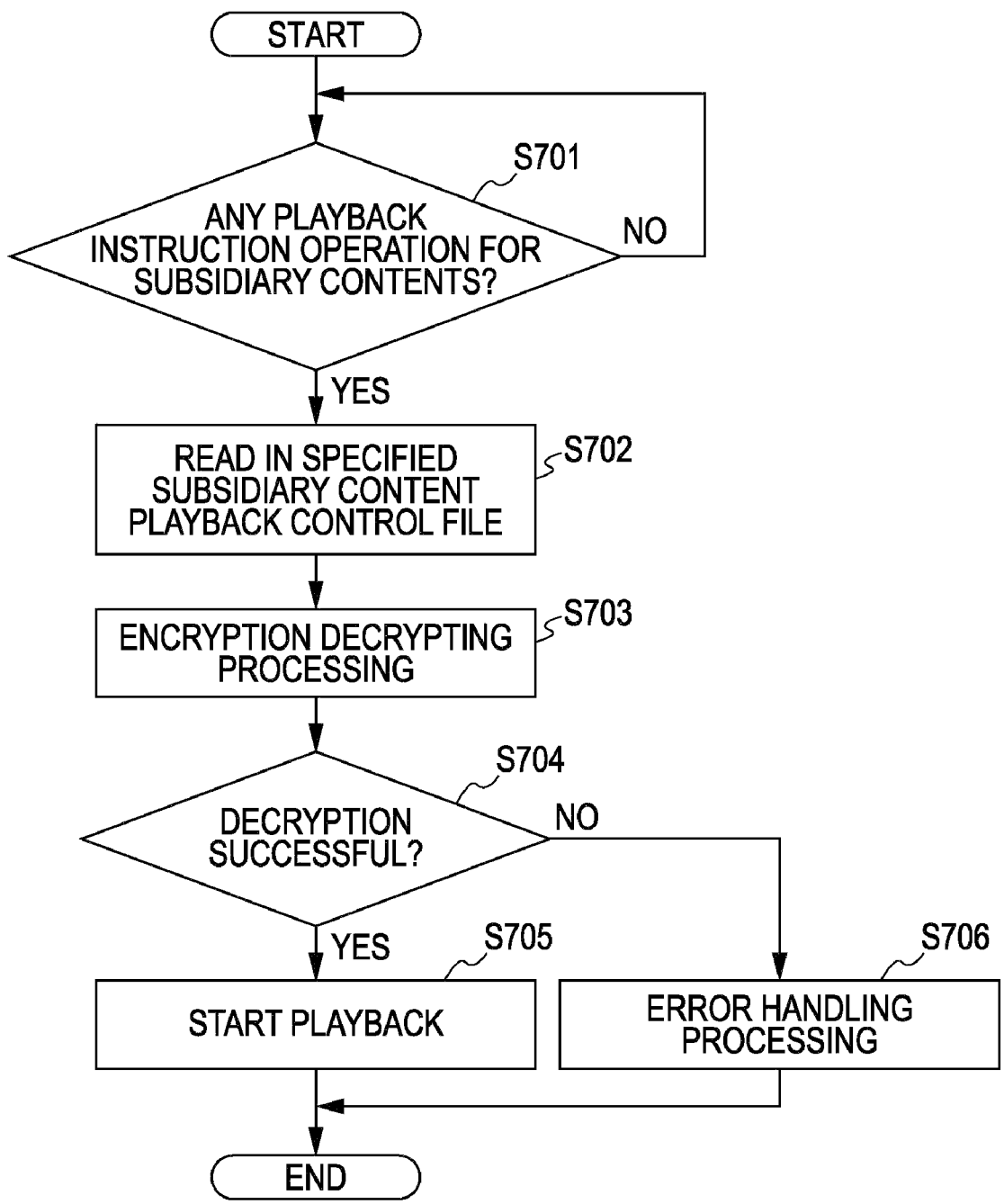
FIG. 21 is a flowchart illustrating an example of processing procedures of playing a subsidiary content by the user terminal device.

The flowchart in FIG. 21 illustrates a processing procedure example of the user terminal device 4 to play the subsidiary content obtained by downloading (saved in HDD 48), and the processing of the user terminal device 4 in this drawing is realized by programs primarily serving as the subsidiary content saving managing processing unit 115, encryption/decryption processing unit 119, and audio playback signal processing unit 120.

First, in step S701, obtaining of a playback start instruction regarding the subsidiary content saved in the HDD 48 by downloading is awaited. Now, let us say that for example, as an operation as to the GUI realized by the subsidiary content saving managing processing unit 115, one subsidiary content is selected from the subsidiary contents saved in the HDD 48, and an instruction is given to start playing, the flow proceeds from step S701 to step S702.

In step S702, the subsidiary content playback control file corresponding to the specified subsidiary content is read in from the HDD 48.

Here, the subsidiary content data obtained by downloading is saved in the HDD 48 with the encryption at the time of transmission left. Accordingly, in the next step S703, processing for decrypting the read in subsidiary content data is executed.

In step S704, determination is made regarding whether or not the encryption decrypting processing in the above step S703 has been successful.

For example, in the event that the subsidiary content data regarding which starting of playing has been specified this time in step S701 has been legitimately downloaded from the content server 2, the decrypting processing in step S703 will be successful and proper subsidiary content data will be restored.

Conversely, in the event that the subsidiary content data has been obtained by some way other than downloading from the subsidiary content server 2 for example, either encryption has been performed with another method or algorithm, or no encryption has been performed. In this case, depending on the decrypting processing in step S703, either proper subsidiary content data is not restorable, or decrypting processing is inapplicable. That is to say, as for the results of the decrypting processing in step S703, this can be viewed as failing, including cases that decrypting processing is inapplicable.

In the event that positive determination results have been obtained that the decrypting processing has been successful in step S704, the flow proceeds to step S705, and playback control processing regarding the subsidiary content is started. Conversely, in the event that a negative decryption result has been obtained in step S704 that the decrypting processing has failed, the flow proceeds to step S706, and error handling processing is executed. As for this error handling processing, first, playback control processing regarding the subsidiary content regarding which playback has been specified this time is kept from being started, and thereupon for example, control processing for notifying on a GUI that the subsidiary content regarding which playback has been specified this time is unauthorized and unplayable, and so forth, is executed.

By such processing being executed for example, with the present embodiment, only subsidiary content information externally obtained which has been legitimately downloaded and obtained from the subsidiary content server 2 is played at the user terminal device 4, whereby the copyright of the primary content or subsidiary content is fully protected.

Note that as for an arrangement for playing and outputting only subsidiary content legitimately downloaded from the subsidiary content server 2, other arrangements can be conceived. For example, a configuration may be conceived wherein encryption is decrypted beforehand at the point of the user terminal device 4 receiving and obtaining as a download, and is stored in the HDD 48 with the decryption result information attached thereto, and at the time of playing, the attached information of the decryption results is referred to, so as to make determination regarding whether or not to play the subsidiary content. Also, an arrangement may be made wherein a special code indicating that transmission has been made for downloading is embedded in the subsidiary content as processing at the subsidiary content server 2 side at the time of transmission from the subsidiary content server 2, and at the time of playing, presence/absence of this code, and the content thereof and so forth is confirmed at the user terminal device 4 side, so as to determine whether or not to start playing.

A configuration described below, based on the basic configuration described so far, is made with the present embodiment, which makes management of primary contents more efficient.

Figure 22:
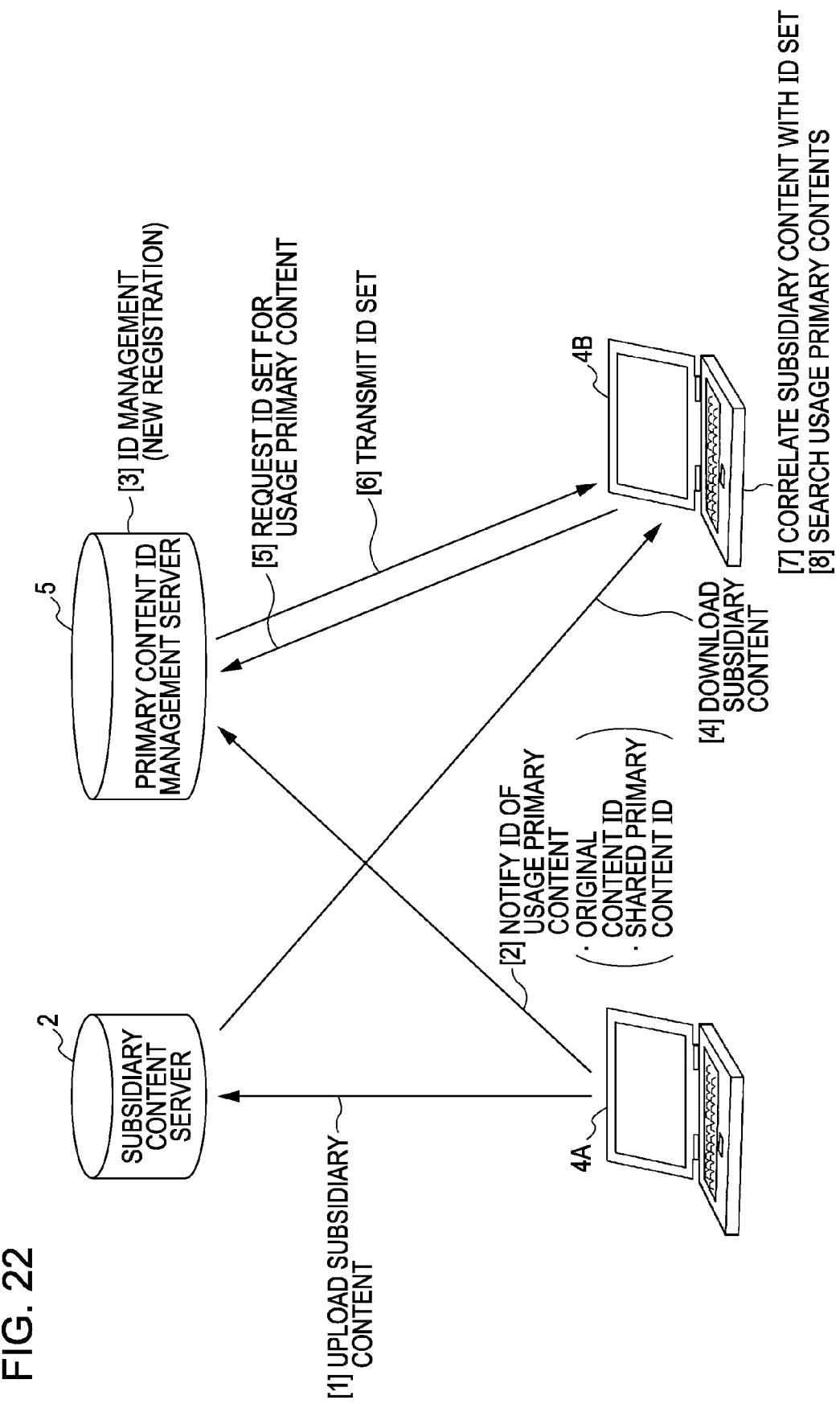
FIG. 22 is a diagram schematically illustrating content ID management according to an embodiment, and the procedures within a system relating to searching of usage primary contents based on the content ID management.

FIG. 22 schematically illustrates an example of a form of content management by ID with a system according to the present embodiment. Description will be made following the order of procedures and operations indicated by the numerals in the brackets in the drawing, in the same way as with FIG. 2 described earlier. FIGS. 23 and 24 will also be reference as appropriate in description of FIG. 22.

First, FIG. 22 shows a primary content ID management server 5, which is new to this description. The primary content ID management server 5 is situated on the network NW along with the original audio content server 1, subsidiary content server 2, and communication server 3, described with FIGS. 1 and 2, for example. The primary content ID management server 5 manages IDs relating to primary contents (primary content ID), as described later.

Procedure 1

Here, subsidiary content (subsidiary content playback control file) is uploaded from the user terminal device 4A. Uploading of the subsidiary content corresponds to Procedure 3 in FIG. 2 described above, for example, and also corresponds to Procedure 4 in the flowchart in FIG. 19.

Procedure 2

Upon the uploading of subsidiary content in Procedure 1 being completed, as the next procedure, the user terminal device 4A notifies (transmits) the primary content ID management server 5 of information of the original content ID and shared primary content ID, correlated to each of the usage primary contents in the subsidiary contents uploaded this time in Procedure 1.

Procedure 3

In response to having received notification of the IDs (original content ID, shared primary content ID) transmitted in Procedure 2, the primary content ID management server 5 manages the primary content IDs as follows.

FIG. 23 schematically illustrating a structure example of a primary content ID database (51) which the primary content ID management server 5 manages. The primary content ID management server 5 manages primary content IDs with the primary content ID database.

With the primary content ID database, one or more format IDs (format identification information) are correlated with each shared primary content ID, thereby forming one ID set. For example an ID set corresponding to the shared primary content ID=A shown at the upper most tier in FIG. 23 is the packaged media sound source ID (1)=α, the packaged media sound source ID (2)=β, the distribution sound source ID (1)=γ, and the distribution sound source ID (2)=δ. Such an ID set is also provided for each shared primary content ID=B, C, and so on.

As can be understood from the description so far, the shared primary content ID has a unique value according to the content of audio serving as a single content. On the other hand, the format ID correlated with the shared primary content ID in the ID set is an ID which is unique for each ID within the range of the format of the actual original audio content data. Format IDs belonging to the same ID set indicate the original audio content data (content data by format) having the same contents of audio as the contents indicated by the correlated shared primary content ID, within the range of that format.

Upon receiving the set of information of the original content ID and shared primary content ID of the usage contents transmitted in Procedure 2, the primary content ID management server 5 first searches the primary content ID database with the received shared primary content ID as the search condition. In the event that the results of the search show that the same shared primary content ID as that received was not found in the primary content ID database, that means that the primary content (usage primary content) received this time has not yet been registered in the primary content ID database. In this case, the ID set generated by correlating the received shared primary content ID and the original content ID also received, in the primary content ID database. This registration adds another row to the database structure shown in FIG. 23 for example, corresponding to the newly registered ID set.

Also, in the event that the same shared primary content ID as that received has been found in the primary content ID database, this means that the ID set of the primary content corresponding to the ID received this time has already been registered in the primary content ID database. As the next procedure, a search is made in the format IDs making up the ID set corresponding to the found shared primary content ID regarding whether or not there is a format ID matching the received original content ID.

In the event that there has been found a format ID matching the received original content ID, the original content ID received this time is confirmed to have been already registered in the primary content ID database as a format ID. On the other hand, in the event that no format ID is found matching the received original content ID, this means that the original content ID received this time has net yet been registered in the primary content ID database as a format ID. Accordingly, in this case, the original content ID is newly registered as a format ID.

With regard to correlation with FIG. 23, let us say that so far, the format IDs registered corresponding to the shared primary content ID have been only the three of packaged media sound source ID (1)=α, packaged media sound source ID (2)=β, and distribution sound source ID (2)=δ, with the shared primary content ID of the usage primary content received this time indicating "A", and the original content ID being "γ" which corresponds to the distribution sound source ID (1). Accordingly, in this case, γ, which is the value of the ID is stored in the space corresponding to the distribution sound source ID (1) corresponding to shared primary content ID=A.

Thus, the set of [shared primary content ID, original content ID] information regarding the usage primary content of the uploaded subsidiary content is transmitted from the user terminal device 4 in Procedure 2, and the primary content ID management server 5 manages the primary content ID database based on obtaining thereof. Accordingly, there is provided an arrangement wherein registration of usage primary contents in accordance with all subsidiary contents uploaded to the subsidiary content server 2 is automatically carried out.

Procedure 4

Here, a certain subsidiary content is downloaded from the subsidiary content server 2 by the user terminal device 4B. The download here is the same as with Procedure 9 in FIG. 2.

Procedure 5

At a certain opportunity or timing following completion of downloading of subsidiary content in Procedure 4, the user terminal device 4B requests an ID set of each usage primary content in the downloaded subsidiary content. The shared primary content ID of the usage primary content is transmitted at the time of requesting the usage primary content (specification of the content as to the server device). AS described earlier with reference to FIG. 13, the shared primary content ID of the usage primary content is stored in the usage primary content information of the subsidiary content playback control file.

Procedure 6

In response to request for the ID set, the primary content ID management server 5 transmits the requested ID set of the usage primary content. In order to do so, the primary content ID management server 5 searches for the shared primary content ID received along with the request for the ID set, from the primary content ID database, for example. An ID set made up of format IDs correlated with the found shared primary content ID is then transmitted.

Procedure 7

Upon receiving the ID set transmitted from the primary content ID management server 5 as described above, the user terminal device 4B correlates and manages the corresponding subsidiary content playback control file and the ID set received this time.

Figure 24A:
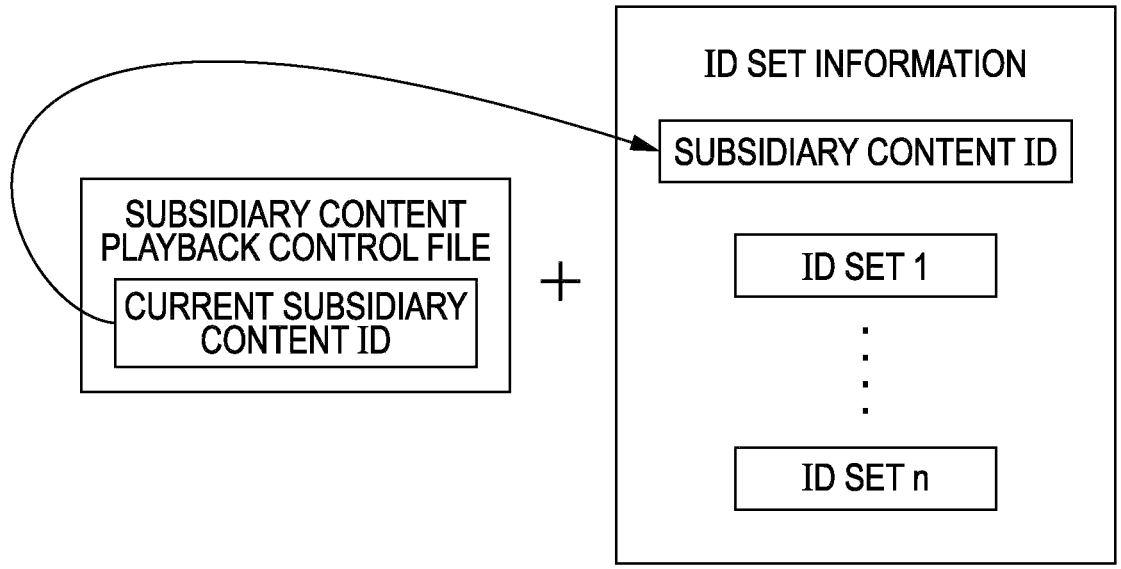
FIG. 24 is a diagram schematically illustrating a form of the way in which a subsidiary content playback control file and ID set information are correlated and managed at a user terminal device.
Figure 24B:
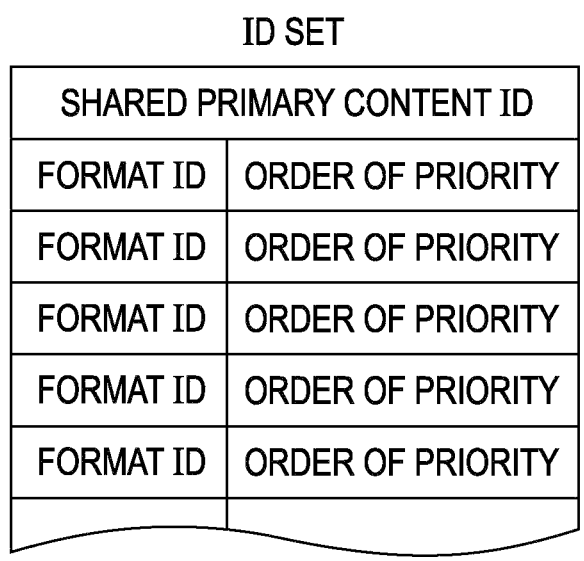
Figure 25:
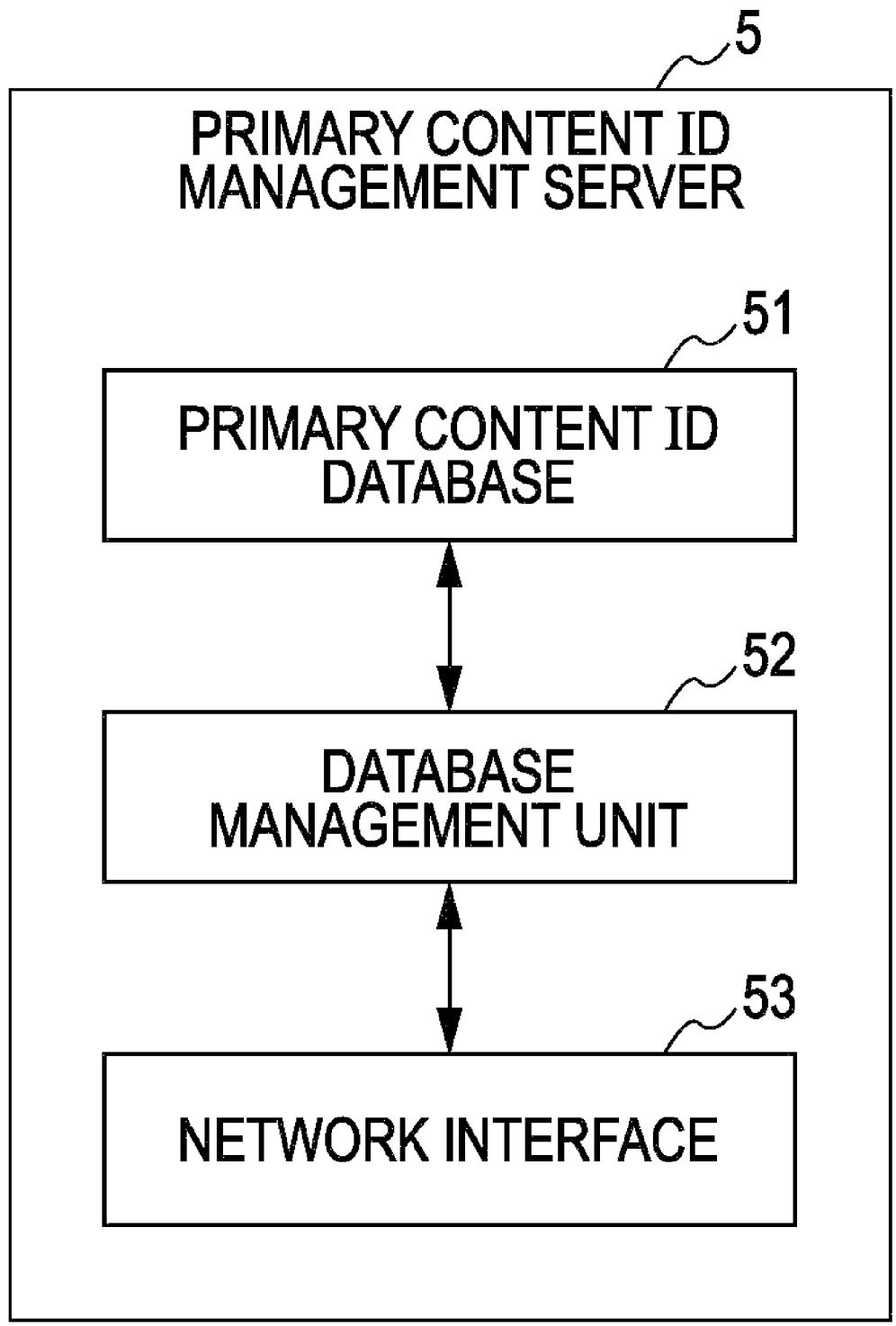
FIG. 25 is a block diagram illustrating an example of the configuration of a primary content ID management server.

FIGS. 24A and 24B schematically show an example of correlating subsidiary content (subsidiary content playback control file) and ID sets.

First, the user terminal device 4B generates unit information as ID set information as shown in FIG. 24A, of ID sets 1 through n obtained by receiving n usage primary contents shown in a corresponding subsidiary content playback control file. This ID set information is saved so as to be correlated with a corresponding subsidiary content playback control file. Note that in order to correlate the ID set information and subsidiary content playback control file, a subsidiary content ID for identifying the subsidiary content playback control file to be correlated for example, is inserted into the header portion of the ID set information, for example. Accordingly, the subsidiary content playback control file and the ID set information are correlated by comparing the subsidiary content ID stored in the subsidiary content playback control file and the subsidiary content ID stored in the ID set information.

As shown in FIG. 24A, in a state wherein the ID set information is correlated with the subsidiary content playback control file, the user terminal device 4B can recognize the IDs of all original audio content data (original content ID) of different formats, for each usage primary content in the subsidiary content playback control file which it has downloaded itself.

Also, FIG. 24B schematically illustrates an example of the structure of an ID set making up the ID set information shown in FIG. 24A. As shown in FIG. 24B, one ID set is made up of a shared primary content ID correlated with the corresponding usage primary content, and format IDs correlated with the shared primary content ID. These format IDs are format IDs in the ID set transmitted to the user terminal device 4B from the primary content ID management server 5 in Procedure 6 in FIG. 22. That is to say, the format IDs are IDs of original audio content data (original content ID) of predetermined sound source types and formats, having the contents of the audio of the corresponding usage primary content.

Also, in an ID set, the stored format IDs are given an order of priority in accordance with predetermined rules, and as shown in FIG. 24B, an order of priority set for each format ID is stored. How the order of priority is set will be described later.

Procedure 8

Now, as described regarding Procedure 11 in FIG. 2, in order to play audio of the subsidiary content at the user terminal device 4, the actual audio data of the editing material content, i.e., all usage primary content of the subsidiary content, has to be present locally. Procedure 8 is content searching processing for enabling all usage primary content for playing the subsidiary content to be present locally, and the present embodiment is configured such that searching processing of the usage primary content can be efficiently automatically executed based on management of the subsidiary content playback control file and ID set, shown in FIGS. 24A and 24B. The flow of procedures for this searching procedure will be described later.

FIG. 24 illustrates an example of the internal configuration of the primary content ID management server 5. The primary content ID management server 5 shown here has a primary content ID database 51, database managing unit 52, and network interface 53. The primary content ID database 51 is structured as a database for managing primary content IDs with the structure shown in FIG. 23 earlier, and in practice is held in a state of being stored in an HDD or the like.

The database managing unit 52 executes various predetermined managing and processing relating to the primary content ID database, such as the new registration of primary content IDs described as Procedure 3 in FIG. 22 above.

The network interface 53 executes control and processing for communication over the network NW. Accordingly, communication with the user terminal device 4 side, which is the client, is realized.

The flowchart shown in FIG. 26 illustrates an example of processing procedures executed between the user terminal device 4 (4A) and primary content ID management server 5 with regard to managing of primary content IDs according to the present embodiment.

Note that the procedures of the user terminal device 4 shown in FIG. 26 are realized by the CPU 41 executing a program serving as the content managing/editing tool 101 at the music editing/sharing application 100. Also, the procedures at the primary content ID management server 5 are executed with primarily the database managing unit 52 and network interface 53 operating cooperatively. Operations of a higher order processing layer of the primarily the database managing unit 52 and network interface 53 are realized by a computer system which the primary content ID management server 5 has executing a program.

First, in step S801, the user terminal device 4 stands by for uploading of subsidiary contents executed as Procedure 1 in FIG. 22 to be completed, and upon completion of uploading being confirmed, the procedures of step S802 are executed.

In step S802, communication control is executed for notification of the IDs of usage primary contents (original content ID and shared primary content ID) in the subsidiary content (subsidiary content playback control file) uploaded in step S801 as to the primary content ID management server 5.

In step S901, the primary content ID management server 5 obtains the IDs transmitted in step S802. Due to this processing, the primary content ID management server 5 obtains the IDs (original content ID and shared primary content ID) for all usage primary contents in the subsidiary content playback control file uploaded in Procedure 1 in FIG. 22.

In step S902, 1 is substituted into the variable n indicating the order (No.) of the usage primary content to be processed, and the procedures of step S903 on is executed.

In step S903, searching processing is executed at the primary contented database 52, with the shared primary content ID correlated to the usage primary content set as the n'th, out of the shared primary content IDs received in step S901 as the search condition. In step S904, determination is made regarding whether or not a matching search result has been obtained, i.e., whether or not a shared primary content ID which is the same as that correlated with the n'th usage primary content is registered in the primary content ID database 52.

In the event that a negative determination result is obtained in step S904, this means that the n'th usage primary content is not registered in the primary content ID database 52. In this case, the flow advances to step S908, a new ID set made up of the newly received shared primary content ID of the n'th primary content and the shared primary content ID is created, and this is newly registered in the primary content ID database 52. Upon executing the processing in step S908, the flow proceeds to step S909.

On the other hand, in the event that a positive determination result is obtained in step S904, this means that the n'th usage primary content is registered in the primary content ID database 52. However, at this point, it is still unknown whether the shared primary content ID of the n'th usage primary content received and obtained this time has been registered as a format ID in the ID set. Accordingly, in step S905, a search is made in the format IDs stored in the ID set found in step S903 for one matching the shared primary content ID of the n'th usage primary content received and obtained this time.

In step S906, determination is made regarding whether or not a matching result has been obtained as the search processing results of step S905. In the event that a negative determination result is obtained, this means that the shared primary content ID of the n'th usage primary content received and obtained this time has not been registered as a format ID in the ID set. Accordingly, in this case, in step S907 the ID set found in step S903 has the shared primary content ID of the n'th usage primary content received and obtained this time additionally registered as a new format ID, and the flow advances to step S909.

In the event that a positive determination result is obtained, this means that the shared primary content ID of the n'th usage primary content received and obtained this time has been registered as a format ID in the ID set. In this case, step S907 is skipped and the flow advances to step S909.

In step S909, determination is made regarding whether or not the currently set variable n is the maximum value. The maximum value of the variable n is the same as the number of usage primary contents correlated to the sets of IDs (shared primary content ID and shared primary content ID) received and obtained in step S901.

In the event that a negative determination result is obtained in step S909, this means that there is still a usage primary content remaining that has not been processed yet. In this case, in step S910 the variable n is incremented, and the processing returns to the procedure in step S903.

On the other hand, in the event that a positive determination result is obtained in step S909, this means that processing has been performed on all usage primary contents, so the processing shown in FIG. 26 ends.

Next, the processing procedures executed between the user terminal device 4 (4B) which is a client device, and the primary content ID management server 5 which is a server device, for correlating and managing subsidiary contents (subsidiary content playback control file) and ID set at the user terminal device (4B), shown as procedures 5 through 7 in FIG. 22, will be described with reference to FIG. 27. Note that the procedures for the user terminal device 4B shown in FIG. 27 are realized by the CPU 41 executing a program serving as the content managing/editing tool 101 at the music editing/sharing application 100.

At a predetermined opportunity or timing following downloading of the subsidiary content (subsidiary content playback control file) according to Procedure 4 in FIG. 22 having been completed, in step S1001 the user terminal device (4B) requests the primary content ID management server 5 for an ID set corresponding to the usage primary contents of the downloaded subsidiary content (subsidiary content playback control file). Note that as described with Procedure 5 in FIG. 22, at the time of requesting the ID set, a list of shared primary content IDs correlated with the usage primary contents of the subsidiary content is transmitted.

As for an opportunity or timing at which the processing of step S1001 should be performed, automatic execution immediately following completion of downloading can be conceived, for example. Also, an arrangement may be conceived wherein the processing of step S1001 is executed in response to user operations as to the content managing/editing tool 101.

The primary content ID management server 5 executes the procedures of steps S1101 and S1102 in response to reception of the request for ID set transmitted in step S1001. In step S1101, first, the ID set corresponding to the shared primary content ID is searched in the primary content ID database 52 for each usage primary content received in step S1101, and in step S1102, the information of the found ID set is transmitted to the user terminal device 4 which is the requesting party.

At the user terminal device (4B) which has received the ID set transmitted thereto in step S1102, the received ID set is correlated to the relevant subsidiary content in step S1002. The processing here is the same as that described with reference to FIGS. 24A and 24B.

Also, at the time of correlating the ID set to the relevant subsidiary content, an order of priority is set in each ID set for the format IDs (shared primary content IDs) stored therein, as shown in FIG. 24B.

An example of setting the order of priority will be described now. As can be understood from the flowchart in FIG. 28 to be described later for example, the order of priority is used for searching processing of usage primary contents. Based on this, with the present embodiment, "fidelity" at the time of playing the audio of the subsidiary content, the "cost" for obtaining the usage primary content, and the quality of sound at the time of playing the audio of the subsidiary content, i.e., "playback quality", are taken into consideration.

At the time of creating subsidiary content, there may be cases wherein the editor is intentionally selecting a sound source of an original audio content serving as a usage primary content. An example of this would be a case wherein the user intentionally uses a sound source obtained by converting audio signals from an analog sound source such as a vinyl record into digital signals and acquiring the signals, as the usage primary content, to obtain desired effects. If we consider that there is such a possibility, giving priority to original audio content data of the sound source and format actually used for editing and creating the subsidiary content is appropriate for obtaining the aforementioned "fidelity". That is to say, setting order of priority based on "fidelity" involves first giving a highest order of priority for those which have a sound source type and format matching the original audio content actually used as editing material at the time of editing and creating the subsidiary content, and thereafter, giving higher order of priority for those which have a sound source type and format closer matching the original audio content actually used as editing material at the time of editing and creating the subsidiary content. Note that the sound source type and format matching the original audio content actually used as editing material at the time of editing and creating the subsidiary content can be identified by the shared primary content ID within the unit file information in the usage primary content information (FIG. 13).

Note that depending on the format of the original audio content, there may be cases wherein the user has to pay a fee to download from an original audio content server 1. Obtaining original audio contents in this way will lead to a monetary burden on the user, i.e., costs, which is not desirable. Accordingly, with the order of priority based on "cost", the lower the monetary burden (cost) is, the higher order of priority is set. In order for the order of priority to be set based on cost, the content managing/editing tool 101 has to recognize the amount of money for obtaining the original audio content of each format. To this end, a configuration may be conceived wherein the content managing/editing tool 101 communicates with an appropriate number of original audio content servers situated on the network to obtain information regarding the amount of money.

Also, depending on the format of the original audio content, the playback quality obtained by playing may differ. For example, it is generally recognized that digital sound sources have higher playback quality than analog sound sources. Even among digital sound sources, the playback quality of PCM sound sources will differ according to sampling frequency and quantization bits, and further, digital sound sources that have been subjected to audio compression encoding have different playback quality depending on the format, and further depending on the compression rate (bit rate) within the same format. It can be conceived that the better the playback quality of the audio data to serve as the usage primary content is, the higher the quality of audio playback of the subsidiary content will be, which is preferable.

Accordingly, with regard to "playback quality", the higher the playback quality of the audio source type and format is, the higher order of priority is set. AS described above, the playback quality is determined in accordance with the audio source type and format of the original audio content, and the original content ID (format ID) is stipulated as being different for each sound source type and format, for the same contents of the audio. Accordingly, the content managing/editing tool 101 can recognize the corresponding sound source type and format by the value of the format ID (original content ID) stored in the received ID set, and can assign order of priority according to the playback quality.

With this in mind, with the present embodiment, of the reference items for setting order of priority, which are "fidelity", "cost", and "playback quality", the highest priority is given to "fidelity". That is to say, audio playback of subsidiary contents as true as possible to the intent of the creator of the subsidiary content is given the highest priority.

Also, for setting order of priority for each set in step S1002 as the actual processing may be performed with an algorithm described next. That is, points are assigned to each of the "fidelity", "cost", and "playback quality", corresponding to the sound source type and format of the original audio content to which the format ID stored in the ID set corresponds. At this time, "fidelity", is weighed heavier than "cost", and "playback quality". The total number of points is then tallied, and the order of priority determined and assigned.

Note that this algorithm is only an example. What sort of priority (weighting) to give which reference item of order of priority as order of priority rules, and how many of what sort of reference items of order of priority to set, may be determined taking into consideration actual operations.

Figure 28:
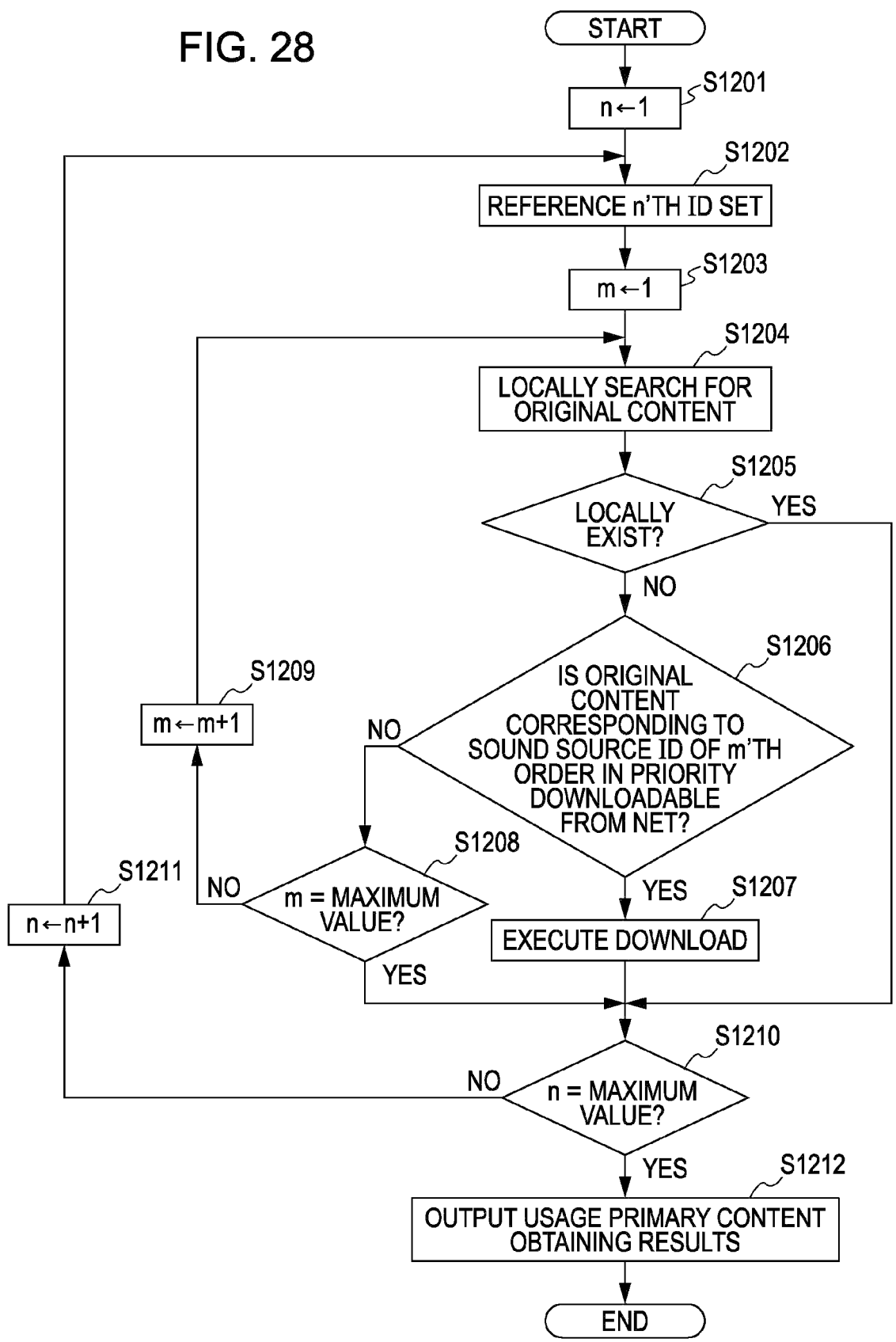
FIG. 28 is a flowchart illustrating an example of processing procedures of searching processing for usage primary contents to be used for playback of subsidiary contents.

The flowchart shown in FIG. 28 illustrates an example of procedures to be executed by the user terminal device 4B (content managing/editing tool 101) for searching processing of usage primary contents to be used for playing of the downloaded subsidiary content (relevant subsidiary content), shown as Procedure 8 in FIG. 22.

In FIG. 28, first, in step S1201 1 is substituted into the variable n indicating the No. to be assigned to one or more usage primary contents in the relevant subsidiary content.

In step S1202, the n'th ID set (ID set n) in the ID set information shown in FIGS. 24A and 24B is referred to. Step S1203 and on is processing for searching for original audio content correlated with the format ID stored in the n'th ID set referred here.

In step S1203, 1 is substituted into a variable m indicating the order of priority assigned to the format ID stored in the n'th ID set.

In the following step S1204, the original audio content to which the format ID (original content ID) with the m'th order of priority has been correlated is first searched for on the user terminal device 4B. This is equivalent to determining whether or not original audio content data of a sound source type and format of which the order of priority is the m'th exists locally as n'th usage primary content. Step S1205 is a procedure for performing this determination.

In step S1205, in the event that a positive determination result is obtained that original audio content data of a sound source type and format of which the order of priority is the m'th exists locally, the flow advances to the later-described step S1210. This flow wherein the flow advances to step S1210 in accordance with a positive determination result having been made in step S1205 means that processing of obtaining subsequent original audio content data serving as n'th primary contents has been ended, because original audio content data to be used as n'th usage primary content exists locally.

On the other hand, in the event that a negative result has been obtained in step S1205, the flow proceeds to step S1206.

In step S1206, determination is made regarding whether or not an original audio content correlated to the format ID (original content ID) of which the order of priority is m'th can be downloaded form the network. This determination can be made by determining whether or not the format ID of which the order of priority is m'th is that of the distributed sound source.

In the event that a positive determination result is obtained in step S1206, control is effected to download data of the original audio content correlated with a format ID of which the order of priority is m'th via the network. This download can be performed by specifying the content to be downloaded by the format ID of which the order of priority is m'th. Upon completion of this download, data of the original audio content correlated with the format ID of which the order of priority is m'th will exist locally. This, with the procedures shown in FIG. 28, original audio content which is downloadable from the network and should exist locally is automatically locally saved by downloading.

On the other hand, in the event that a negative determination result is obtained in step S1206, the flow proceeds to step S1208. A negative determination result being obtained in step S1206 means that the original audio content correlated with the format ID of which the order of priority is m'th is of a sound source type which should be obtained by a method other than downloading over the network, such as digital sound source from a packaged media sound source or acquired through the data interface (including analog sound source converted into digital).

In step S1208, determination is made regarding whether or not the variable m is the maximum value. In the event that a negative determination result is obtained here, this means that there is a format ID that has not been processed remains in the n'th ID set, so in step S1209 the variable m is incremented, and the flow returns to step S1204.

On the other hand, in the event that a positive determination result is obtained in step S1208, this means that all format IDs in the n'th ID set have been processed, so the flow advances to step S1210. In the event that a positive determination result is obtained in step S1208, this means that the original audio content data serving as the usage primary content corresponding to the n'th ID set is not locally situated, and further could not be obtained by downloading.

In step S1210, determination is made regarding whether or not the variable n is the maximum value (the number of ID sets stored in the ID set information). In the event that a negative determination result is obtained here, this means that there remains an ID set in the ID set information which has not yet been made the object of searching. In this case, the variable n is incremented in step S1211, and the flow returns to step S1202. Thus a search is performed regarding the usage primary content (original audio content data) for the next ID set.

Upon the processing corresponding to the above-described steps S1202 through S1208 being repeated as many times as there are ID sets, a positive determination result is obtained in step S1210, and the flow advances to step S1212.

In step S1212, processing is executed for outputting what has been obtained as the original audio content data serving as the usage primary content according to the processing so far, onto the GUI screen of the content managing/editing tool 101 for example, in a predetermined display format.

With this display of what has been obtained for the usage primary contents, original audio contents already existing, original audio content newly downloaded from a distribution server (original audio content server) so as to exist locally, and original audio content not existing locally, can be displayed in a manner correlated with the usage primary contents, for example. The user can understand the state of obtaining the original audio content data, which is the actual entity of the usage primary content to be used for playing the subsidiary content.

In the display of what has been obtained for the usage primary contents, a display is preferably made to instruct the user how to obtain original audio contents which do not locally exist. This is because locally saving the original audio content data corresponding to the usage primary content which could not be locally situated in the automatic obtaining processing of the original audio content involves user work, such as using packaged media as a sound source, or acquisition via the data interface, or the like.

According to description of FIG. 22 and subsequent drawings made so far, with the present embodiment, the user terminal device 4 (content managing/editing tool 101) manages each usage primary content of the subsidiary content by correlating the IDs of original audio content data (original content ID, format ID) of formats sharing the same contents of playback (hereinafter, also referred to as "usage primary content ID management". Performing this usage primary content ID management means that the device which performs this managing has ID set information, which in turn means that the device is capable of processing all original audio content provided with the format ID (original content ID) stored in the ID set information. This also means that the device performing the usage primary content ID management (the user terminal device 4 in this case) is capable of using all original audio contents provided with the format IDs (original content IDs) stored in the corresponding ID set, as usage primary contents.

Now, the user terminal device 4 according to the present embodiment which performs the usage primary content ID management searches the original audio content data serving as the usage primary contents. With the searching procedures, original audio content data already locally existing can be handled as usage primary content, as long as matching the original content ID (format ID) held as ID set information (ID set group) by the usage primary content ID management. This means that even if the format is not the same as that of the primary contents actually used as the editing material at the time of editing the subsidiary content for example, the locally-existing original audio content data can also be actually used as usage original audio content to be used for playing of the subsidiary content for example, as long as the content of the audio serving as the usage primary content is the same. In the event that original audio content data already existing locally is to be used as the usage primary contents, there is no need to obtain the original audio content by downloading or by acquisition through the data interface, thereby reducing costs and work.

Also, while FIG. 28 shows that in the event that the original audio content data corresponding to a certain usage primary content does not exist locally, this is obtained by downloading or the like, but at this time as well, in the event that there is no distribution on the network of a primary content actually used as an editing material in the same format, the original content ID (format ID) 0 stored in the ID set is referred to, and original audio content data which is downloadable is downloaded and acquired. That is to say, even in the event that original audio content data of the same format actually used as editing material at the time of editing the subsidiary content is not obtainable, consideration has been given such that the original audio content data of the same contents in audio can be obtained and used for audio playing of the subsidiary content.

That is to say, an environment is provided wherein, regardless of difference in the data format of the original audio content data for the primary content to be used in playing of the subsidiary content, original audio content data of a diffident data format is handled as the same content as long as the contents of audio are the same, and can be used for playing the subsidiary content.

Now, the configuration of an embodiment of the invention is not restricted to application of the music distribution/sharing system described so far, and can be applied advantageously to other systems as well. An example of application to a system of another form will be described with reference to FIG. 29.

In FIG. 29, devices making up a system include an audio content server 110, user terminal devices 4 (4A, 4B), communication server 130, and content ID management server 150.

The audio content server 110 is a server for distributing audio data serving as audio contents, and the configuration thereof is equivalent to that of the original audio content server 1 shown in FIG. 6, for example. Note that while only one audio content server 110 is shown here, in actual practice, multiple audio content servers 110 are provided in accordance with various distribution services, record labels, and so forth.

The user terminal device 4 is in reality owned by the user, with a great number thereof on the network. Also, the user terminal device 140 is a personal computer or the like hardware-wise, and has a configuration equivalent to that shown in FIG. 9, for example.

The communication server 130 is a server for providing blogs (or SNSs) in this case, and can provide blogging functions based on the configuration shown in FIG. 8, for example.

The content ID management server 150 is a server for performing ID management the same as with the usage primary content ID management described earlier with reference to FIG. 24, with regard to currently-existing original audio contents.

Operations of the system shown in FIG. 29 will be described following the numbers of the procedures shown in the brackets [ ].

Procedure 1

We will say that the user of the user terminal device 4A has decided to introduce a favorite one of the original audio contents saved locally at the user terminal device 4A, to the readers of his blog. This audio content is locally-existing audio content, and has been previously downloaded from a certain audio content server 110 and locally saved (downloaded content). At the time of writing to the blog, the user of the user terminal device 4A performs an operation for uploading the data of the downloaded content which he likes, to the blog.

Procedure 2

At the communication server 130, in response to audio content being uploaded as described above, the uploaded audio content is posted (linked) to the blog, thereby executing the processing regarding content data for the blog. Note however, that there are two different forms of posting audio contents (uploaded contents) that have been uploaded to a blog, depending on the copyrights of the audio contents.

First, in a case wherein the uploaded contents are copyright-free, or the uploaded contents are created by the user of the user terminal device 4A himself, or the like, and no third party other than the user terminal device 4A owns the copyrights thereof, the communication server 130 performs blog data processing so as to directly link the data of the uploaded contents to the body portion of the blog which the user has specified.

On the other hand, in the event that the copyright of the uploaded contents belongs to professional musician or the like for example, the communication server 130 does not directly link the data of the uploaded contents to the blog as described above. Instead, the communication server 130 first uses the audio data of the uploaded contents generate a unique value according to the audio features thereof, and takes this as a shared content ID. This shared content ID is an ID unique to each content in accordance with the contents of the audio of the uploaded contents, and accordingly corresponds to the shared primary content ID in the previous embodiment. A program for realizing the content playback processing described in the following Procedures 3 through 5 (content playback program) is then linked to the blog. At this time, the program includes one shared content ID as a playback parameter (setting information). For example, Java (a registered trademark) or the like can be used for this program Procedure 3

Let us then say that the user terminal device 4B has accessed and displayed the contents of the blog where a link to the uploaded contents has been posted. At this time, in the blog as displayed at the user terminal device 4B, a test string or image portion where the link has been posted by Procedure 2 is clickable. Let us say that the user of the user terminal device 4B has read the blog and desires to listen to the audio content, and accordingly clicks on the link.

In this case, if the copyright of the uploaded contents belongs to no one other than the user of the user terminal device 4A, and the audio data of the uploaded contents is directly linked to, the linked audio data at the communication server 130 is called up in response to the clicking operation, and streaming playback of download playback or the like starts.

On the other hand if the copyright of the uploaded contents is held by a third party other than the user of the user terminal device 4A, and the content playback program is linked to, the content playback program is called up and activated at the user terminal device 4B. Operations of the content playback program realize the following Procedures 4, 5, 6 (6-1, 6-2).

Procedure 4

First, the content playback program which has been activated at the user terminal device 4B executes communication control for transmitting an ID set request corresponding to the uploaded contents from the user terminal device 4B to the content ID management server 150. At the time of this request, the content playback program transmits the shared content ID held as a parameter.

Procedure 5

The content ID management server 150 can be configured as having a content ID database instead of the primary content ID database 51. Also, this content ID database can be configured as having the shared primary content ID in the structure of the primary content ID database 51 replaced with the shared content ID described above in Procedure 2. In order to obtain and newly register shared content IDs and format IDs in the content ID database, a system can implemented to receive presentation thereof from music distribution services, general users, and so forth.

At the content ID management server 150, an ID set correlated with the shared content ID transmitted in Procedure 4 along with the request is searched from the content ID database. The found ID set is then transmitted to the user terminal device 4B (content playback program).

The ID set transmitted in this way is received and obtained by the content playback program of the user terminal device 4B. The ID set thus obtained is managed by the content playback program so as to be correlated with the uploaded contents.

At the time of obtaining and managing the ID set in this way, an arrangement may be made wherein the content playback program for example assigns an order of priority as to the format IDs making up the ID set, following a predetermined rule, as described with FIG. 24B. Alternatively, a basic order of priority might be assigned following a predetermined rule at the stage of being managed as the content ID database at the content ID management server 150 side.

Procedure 6

The content playback program, which has obtained the ID set corresponding to the uploaded contents in Procedure 5, then attempts to obtain audio content data of the same contents as the uploaded contents, in accordance with processing shown in FIG. 28, for example. Note that in this case, all that is necessary is to obtain one audio content data per ID set obtained in Procedure 5, and that there is no need to execute a loop corresponding to the variable n according to the number of ID sets.

Let us say that audio content data already locally saved has been found as the audio content data of the same contents of audio as the uploaded contents as a result of the content data obtaining processing such as described above having been executed (equivalent to a case of a positive determination result having been obtained in step S1205). In this case, the content playback program performs playback output of the audio content data saved locally, as shown as Procedure 6-1. In the event that the audio content data is to be played in this way, what is actually be played is the sound source which the user of the user terminal device 4B already owns, so the copyright of the content being played is appropriately protected.

Also, let us say that, as a result of the content data obtaining processing having been executed, it has been found that audio contents of the same contents of audio as the uploaded contents can be downloaded from the audio content server 110 (equivalent to a case of a positive determination result having been obtained in step S1206). In this case, as shown as Procedure 6-2, the audio content of the same contents of audio as the uploaded contents is downloaded from the audio content server 110, and played. One conceivable form of this content playback is so-called download playback, wherein the content is first saved or held locally at the user terminal device 4B (in HDD or RAM, for example), and then the saved audio content data is played by the content playback program. Another form is so called streaming, where the content is not saved locally at the user terminal device 4B (note that with streaming the audio content data is not stored locally in the HDD or other memory). In any case, the download playback in this case involves the audio content data being uploaded by proper procedures from the audio content server 110 (e.g., if pay contents, payment processing is also performed), so the copyright of the content being played is appropriately protected.

Simply posting audio data files to blogs and homepages, to upload contents of which the copyrights belong to a third party, an act which is sometimes performed, is unauthorized in nature from the perspective of copyright protection. Accordingly, introducing contents of which the copyrights belong to a third party in blogs and homepages has been restricted to posting links to vendor sites selling the contents. In such cases, clocking on the link only accesses the vendor selling the contents, and does not necessarily mean that the contents are immediately played in a listenable manner.

However, with the above-described system, contents of which the copyrights belong to a third party can still be played simply by clicking on a link, by local playback or download playback, without infringing on copyrights.

Other procedures for uploading contents and playing contents under the system shown in FIG. 29 can be conceived. For example, while the above description involves the user terminal device 4A uploading audio content data to the communication server 130 in Procedure 1, it can be conceived that the communication server 130 handling the uploaded content data will incur a great processing burden. Accordingly, a configuration for the system shown in FIG. 29 can be conceived as follows.

If we say that the user terminal device 4A is provided with a function to generate shared content IDs, at the time of uploading the content to the communication server 130 a shared content ID for the audio content data to be uploaded is generated, and this is transmitted to the communication server 130. It should be noted that at this time, the audio content data to be uploaded is not uploaded itself. Also, copyright-free content, audio content which the user of the user terminal device 4 has created and owns the copyrights of, and so forth, are assumed to be stored and managed at an appropriate audio content server 110.

With the uploading operation which is Procedure 1, the communication server 130 receives and obtains the shared content ID of the audio content to be uploaded. As Procedure 2, the communication server 130 posts the content playback program including the shared content ID as a parameter in the blog. Note that in this case, the processing of Procedure 2 is performed regardless of whether the copyright of the audio content to be uploaded belongs to a third party other than the user of the user terminal device 4A the operations of the following Procedures 3 through 6 (6-1, 6-2) are the same as described above. With such a configuration, the communication server 130 does not need to process, save, or manage the audio content data, markedly reducing processing load. Also, there is no need to transmit/receive the audio content data in Procedure 1, so the uploading operations of the audio content data is also faster, and traffic is reduced.

Also, an arrangement may be conceived as another example of the above, wherein, at the time of uploading audio content in Procedure 1, the format ID corresponding to the audio content to be uploaded, that is saved at the user terminal device 4A, is transmitted to the communication server 130 along with the shared content ID. In this case, the communication server 130 embeds in the content playback program the shared content ID and format ID (original content ID) as playback parameters, in Procedure 2. At the time of the ID set request in Procedure 4, the format ID is transmitted along with the shared content ID. Thus, the content ID management server 150 can update the content ID database in accordance with the procedures of the primary content ID management server 5 shown in FIG. 26 for example, using the shared content ID and format ID transmitted as the ID set request.

Note that information identifying the format ID (format identification information) may be information for identifying the location of content data by correlated format on a network or locally, such as a URL or file path. With embodiments of the present invention, such information is also viewed as identification information by which content data can be identified within the range of each format.

Also, the present invention is not restricted to configurations serving as the embodiment described so far, and various types can be conceived.

For example, with the embodiment described above, while as for the primary content, digital audio data has been described as being the main constituent in the actual entity (main portion), but an arrangement may be made wherein, at the stage of the primary content, the same data format may be had as the subsidiary content. That is to say, for the primary content, first, a producer creates several sound sources as digital audio data, performs editing processing using each of these sound sources as editing material contents, and creates a playback control file equivalent to a subsidiary content playback control file as the editing result. This playback control file and a file wherein the digital audio data serving as the sound source has been packaged, are taken as primary content.

In this case, the data for reproducing the actual content contents serving as the primary content is the data of the playback control file.

Also, while a specific example of a GUI screen or the like serving as a music editing/sharing application 100 has not been shown in the description so far, widely various configurations of a GUI of the music editing/sharing application 100 can be conceived.

Also, the configurations of the original content server 1, subsidiary content server 2, communication server 3, user terminal device 4, and primary content ID management server 5, shown in FIGS. 6 through 9 and 25, and so forth, are only exemplary and may actually be modified as suitable. Also, a form may be assumed wherein at least one of the above servers are divided into multiple servers. Alternatively, at least two of these servers may be configured integrated.

One suitable arrangement is for the above embodiment is for the primary content ID management server 5 to be included in the subsidiary content server 2. Also, with the case of the modification in FIG. 29, an acceptable configuration is for the content ID management server 150 to be integrated with the communication server 130.

Also, the functional configuration of the music editing/sharing application 100 is not restricted to the content described with FIGS. 10, 11, and so forth, and can be widely varied.

Also, the structure of the subsidiary content playback control file shown in FIGS. 12 through 14, and so forth is only exemplary, and conceptual, so various modifications and extensions may be made based on this.

Also, the processing procedures shown as flowcharts and sequence diagrams and so forth by FIGS. 17 through 22, 26 through 29, and so forth, i.e., program configurations, are only exemplary, and actually may be modified as appropriate.

Also, while content to be played and reproduced from primary content data and subsidiary content data has been described so far as being audio contents such as tunes for example, but may be video contents made up of video/audio as moving images. In this case, the data for reproducing the actual content contents serving as the primary content is video signal data (and audio signal data to be played synchronously with the video signals). Also, this may be applied to still image contents such as photographs, images, and so forth, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A server device comprising:
   communication means configured to perform communication via a network;
   identification information management means configured to manage format identification information unique for each content data within a range of each data format, the format identification information corresponding to contents of each content; and identification information transmitting means configured to transmit, to a client device, format identification information correlated with specified content in response to specification of the content via network from said client device, wherein said identification information management means is configured to perform management using correlation information formed by correlating versatile identification information which is unique identification information shared among content data having the same content but different data formats, and format identification corresponding to the same contents, and wherein said identification information transmitting means is configured to transmit the format identification information correlated with the versatile identification information of the specified content, transmitted from said client device, as information for specifying the content.

2. The server device according to claim 1, further comprising:

determination means configured to determine whether
the versatile identification information corresponding to the specified content, transmitted from said client device as information for specifying the content, and
the format identification corresponding to said specified content to be held at said client device,
are registered in said correlation information;
wherein, in the event that determination is made by said determination means that
the versatile identification information corresponding to the specified content, transmitted from said client device as information for specifying the content, and
the format identification corresponding to said specified content to be held at said client device,
are not registered in said correlation information, said identification information management means newly register format identification information corresponding to said specified content, so as to correlate to versatile identification information corresponding to said specified content already registered in said correlation information.

3. An information processing method of a server device, comprising:

performing communication via a network;
managing format identification information unique for each content data within a range of each data format, the formal identification information corresponding to contents of each content; and
transmitting, to a client device, format identification information correlated with specified content in response to specification of the content via network from said client device,
wherein managing the format identification information comprises correlating
versatile identification information that is unique identification information shared among content data having the same content but different data formats, and
format identification corresponding to the same content, and
wherein transmitting the format identification information comprises transmitting the format identification correlated with the versatile identification information of the specified content.

4. At least one computer-readable storage medium having encoded thereon computer-executable instructions that, when executed, cause at least one computer to carr out a method, the method comprising:

performing communication via a network;
managing format identification information unique for each content data within a range of each data format, the format identification information corresponding to the contents of each content; and
transmitting, to a client device, format identification information correlated with specified content in response to specification of the content via network from said client device,
wherein managing the format identification information comprises correlating
versatile identification information that is unique identification information shared among content data having the same content but different data formats, and
format identification corresponding to the same content, and
wherein transmitting the format identification information comprises transmitting the format identification correlated with the versatile identification information of the specified content.

5. A client device comprising:

communication means configured to perform communication via a network;
content specifying means configured to cause execution of communication via network, for specifying a content, to a server device; and
identification information management means configured to
receive and obtain format identification information which is identification information corresponding to a specified content transmitted from said server device in response to the communication for specifying said content, the format identification information being unique for each content data within a range of each data format, and
manage the received and obtained format identification information as corresponding to said specified content,
wherein said content specifying means is configured to cause transmission, to said server device, of versatile identification information corresponding to said specified content as versatile identification information which is unique identification information shared among content data having at least same content but different data formats.

6. The client device according to claim 5, further comprising:

content data processing means configured to
search, from content data locally existing, content data correlated with format identification information managed by said identification information management means, and
set the found content data as content data usable by a predetermined application.

7. The client device according to claim 5, further comprising:

download executing means configured to execute downloading of content data existing on a network, based on the format identification information managed by said identification information management means.

8. An information processing method of a client device, comprising:
  performing communication via a network;
  causing execution of communication via network, for specifying a content, to a server device;
  receiving and obtaining format identification information which is identification information corresponding to a specified content transmitted from said server device in response to the communication for specifying said content, the format identification information being unique for each content data within a range of each data format; and
  managing the received and obtained format identification information as corresponding to said specified content
  wherein causing execution of communication comprises transmitting, to said server device, versatile identification information corresponding to said specified content, the versatile identification information being unique identification information shared among content data having at least same content but different data formats.

9. At least one computer-readable storage medium having encoded thereon computer-executable instructions that, when executed, cause at least one computer to carry out a method, the method comprising:
  performing communication via a network;
  causing execution of communication via network, for specifying a content, to a server device;
  receiving and obtaining format identification information which is identification information corresponding to a specified content transmitted from said server device in response to the communication for specifying said content, the format identification information unique for each content data within a range of each data format; and
  managing the received and obtained format identification information as corresponding to said specified content,
  wherein causing execution of communication comprises transmitting, to said server device, versatile identification information corresponding to said specified content, the versatile identification information being unique identification information shared among content data having at least same content but different data formats.

10. An information processing system comprising:
  a client device functioning as a client;
  a server device functioning as a server and capable of communication with said client device via a network;
  first identification information management means at said server device configured to manage format identification information unique for each content data within a range of each data format, the format identification information corresponding to the contents of each content;
  content specifying means at said client device configured to cause execution of communication via network, for specifying a content, to said server device;
  identification information transmitting means at said server device configured to transmit, to said client device, format identification information correlated with a specified content in response to the specification of a content via network from said client device; and
  second identification information management means at said client device configured to manage the received and obtained format identification information as corresponding to said content specified by said content specifying means,
  wherein said first identification information management means is configured to perform management using correlation information formed by correlating
    versatile identification information which is unique identification information shared among content data having the same content but different data formats, and
    format identification corresponding to the same contents, and
  wherein said identification information transmitting means is configured to transmit the format identification information correlated with the versatile identification information of the specified content, transmitted from said client device, as information for specifying the content.

11. An information processing method of an information processing system including a client device functioning as a client and a server device functioning as a server which are capable of communication via a network, said method comprising:
  at said server device, managing format identification information unique for each content data within a range of each data format, the format identification information corresponding to contents of each content;
  at said client device, causing execution of communication via network, for specifying a content, to said server device;
  at said server device, transmitting, to said client device, format identification information correlated with a specified content in response to specification of a content via network from said client device; and
  at said client device, managing the received and obtained format identification information as corresponding to said specified content,
  wherein managing the format identification information at said server device comprises correlating
    versatile identification information that is unique identification information shared among content data having the same content but different data formats, and
    format identification corresponding to the same content, and
  wherein transmitting the format identification information to said client device comprises transmitting the format identification correlated with the versatile identification information of the specified content.

12. A server device comprising:
  a communication unit configured to perform communication via a network;
  an identification information management unit configured to manage format identification information unique for each content data within the range of each data format, the format identification information corresponding to contents of each content; and
  an identification information transmitting unit configured to transmit, to a client device, format identification information correlated with a specified content in response to the specification of a content via network from said client device,
  wherein said first identification information management unit is configured to perform management using correlation information formed by correlating
    versatile identification information which is unique identification information shared among content data having the same content but different data formats, and
    format identification corresponding to the same contents, and wherein said identification information transmitting unit is configured to transmit the format identification information correlated with the versatile identification information of the specified content, transmitted from said client device, as information for specifying the content.

13. A client device comprising:
a communication unit configured to perform communication via a network;
a content specifying unit configured to cause execution of communication via network, for specifying a content, to a server device; and
an identification information management unit configured to
receive and obtain format identification information which is identification information corresponding to a specified content transmitted from said server device in response to the communication for specifying said content, the format identification information being unique for each content data within the range of each data format, and
manage the received and obtained format identification information as corresponding to said specified content
wherein said content specifying unit is configured to cause transmission, to said server device, of versatile identification information corresponding to said specified content as versatile identification information which is unique identification information shared among content data having at least same content but different data formats.

14. An information processing system comprising:
a client device functioning as a client;
a server device functioning as a server and capable of communication with said client device via a network;
a first identification information management unit at said server device configured to manage format identification information unique for each content data within a range of each data format, the format identification information corresponding to contents of each content;
a content specifying unit at said client device configured to cause execution of communication via network, for specifying a content, to said server device;
an identification information transmitting unit at said server device configured to transmit, to said client device, format identification information correlated with a specified content in response to the specification of a content via network from said client device; and
a second identification information management unit at said client device configured to manage the received and obtained format identification information as corresponding to said content specified by said content specifying unit,
wherein said first identification information management unit is configured to perform management using correlation information formed by correlating
versatile identification information which is unique identification information shared among content data having the same content but different data formats, and
format identification corresponding to the same contents, and
wherein said identification information transmitting unit is configured to transmit the format identification information correlated with the versatile identification information of the specified content, transmitted from said client device, as information for specifying the content.

* * * * *